United States Patent
Lor et al.

(10) Patent No.: US 7,082,133 B1
(45) Date of Patent: Jul. 25, 2006

(54) APPARATUS AND METHOD FOR ENABLING VOICE OVER IP SUPPORT FOR A NETWORK SWITCH

(75) Inventors: Kar-Wing Edward Lor, Castro Valley, CA (US); Mohan Kalkunte, Sunnyvale, CA (US); Shekhar Ambe, San Jose, CA (US)

(73) Assignee: Broadcom Corporation, Irvine, CA (US)

(*) Notice: Subject to any disclaimer, the term of this patent is extended or adjusted under 35 U.S.C. 154(b) by 663 days.

(21) Appl. No.: 09/654,587

(22) Filed: Sep. 1, 2000

Related U.S. Application Data

(63) Continuation-in-part of application No. 09/528,434, filed on Mar. 17, 2000, now Pat. No. 6,850,521.

(60) Provisional application No. 60/152,289, filed on Sep. 3, 1999.

(51) Int. Cl.
*H04L 12/28* (2006.01)

(52) U.S. Cl. ...................... 370/392; 370/352

(58) Field of Classification Search ............ 370/352, 370/389, 395.3, 401, 392, 351
See application file for complete search history.

(56) References Cited

U.S. PATENT DOCUMENTS

| | | |
|---|---|---|
| 5,278,789 A | 1/1994 | Inoue et al. |
| 5,390,173 A | 2/1995 | Spinney et al. |
| 5,414,704 A | 5/1995 | Spinney |
| 5,423,015 A | 6/1995 | Chung |

(Continued)

FOREIGN PATENT DOCUMENTS

EP 0312917 A2 4/1989

(Continued)

OTHER PUBLICATIONS

"A High-Speed CMOS Circuit for 1.2-Gb/s 16×16 ATM Switching," Alain Chemarin et al. 8107 IEEE Journal of Solid-State Circuits 27(1992) Jul., No. 7, New York, US, pp. 1116-1120.

(Continued)

*Primary Examiner*—Chi Pham
*Assistant Examiner*—Dmitry Levitan
(74) *Attorney, Agent, or Firm*—Squire, Sanders & Dempsey LLP

(57) ABSTRACT

An apparatus and method for switching VOIP packets in a data network, wherein the method includes the steps of receiving a first packet in a network switch and determining if the first packet is a VOIP packet. Further, method includes determining a dynamically negotiated VOIP port for a VOIP session from at least one of the first packet and a second packet received in the network switch, if the first packet is determined to be the VOIP packet. Finally, the method includes the steps of classifying all subsequent VOIP packets corresponding to the dynamically negotiated VOIP port in accordance with predetermined parameters. The apparatus includes a network switch having at least one data port interface controller supporting a plurality of data ports for transmitting and receiving data, and a fast filtering processor in communication with the at least one data port interface. At least one filtering table in communication with the fast filtering processor is provided, wherein the fast filtering processor is configured to snoop packets being transmitted through the network switch to trap a VOIP call setup message, and thereafter, determine a dynamically negotiated VOIP port so that all subsequent VOIP packets can be filtered and assigned an appropriate priority.

26 Claims, 27 Drawing Sheets

U.S. PATENT DOCUMENTS

| | | | |
|---|---|---|---|
| 5,459,717 A | 10/1995 | Mullan et al. | |
| 5,473,607 A | 12/1995 | Hausman et al. | |
| 5,499,295 A | 3/1996 | Cooper | |
| 5,524,254 A | 6/1996 | Morgan et al. | |
| 5,555,398 A | 9/1996 | Raman | |
| 5,568,477 A | 10/1996 | Galand et al. | |
| 5,579,301 A | 11/1996 | Ganson et al. | |
| 5,606,668 A * | 2/1997 | Shwed | 713/201 |
| 5,644,784 A | 7/1997 | Peek | |
| 5,652,579 A | 7/1997 | Yamada et al. | |
| 5,696,899 A | 12/1997 | Kalwitz | |
| 5,742,613 A | 4/1998 | MacDonald | |
| 5,748,631 A | 5/1998 | Bergantino et al. | |
| 5,781,549 A | 7/1998 | Dai | |
| 5,787,084 A | 7/1998 | Hoang et al. | |
| 5,790,539 A | 8/1998 | Chao et al. | |
| 5,802,052 A | 9/1998 | Venkataraman | |
| 5,802,287 A | 9/1998 | Rostoker et al. | |
| 5,825,772 A | 10/1998 | Dobbins et al. | |
| 5,828,653 A | 10/1998 | Goss | |
| 5,831,980 A | 11/1998 | Varma et al. | |
| 5,842,038 A | 11/1998 | Williams et al. | |
| 5,845,081 A | 12/1998 | Rangarajan et al. | |
| 5,887,187 A | 3/1999 | Rostoker et al. | |
| 5,892,922 A | 4/1999 | Lorenz | |
| 5,898,687 A | 4/1999 | Harriman et al. | |
| 5,909,686 A | 6/1999 | Muller et al. | |
| 5,918,074 A | 6/1999 | Wright et al. | |
| 5,940,596 A | 8/1999 | Rajan et al. | |
| 5,987,507 A | 11/1999 | Creedon et al. | |
| 6,009,475 A * | 12/1999 | Shrader | 709/249 |
| 6,011,795 A | 1/2000 | Varghese et al. | |
| 6,041,053 A | 3/2000 | Douceur et al. | |
| 6,061,351 A | 5/2000 | Erimli et al. | |
| 6,085,328 A * | 7/2000 | Klein et al. | 713/310 |
| 6,119,196 A | 9/2000 | Muller et al. | |
| 6,175,902 B1 | 1/2001 | Runaldue et al. | |
| 6,185,185 B1 | 2/2001 | Bass et al. | |
| 6,233,234 B1 * | 5/2001 | Curry et al. | 370/356 |
| 6,324,279 B1 * | 11/2001 | Kalmanek et al. | 379/229 |
| 6,400,707 B1 * | 6/2002 | Baum et al. | 370/352 |

FOREIGN PATENT DOCUMENTS

| | | |
|---|---|---|
| EP | 0465090 A1 | 1/1992 |
| EP | 0752796 A2 | 1/1997 |
| EP | 0849917 A2 | 6/1998 |
| EP | 0853441 A2 | 7/1998 |
| EP | 0854606 A2 | 7/1998 |
| EP | 0859492 A2 | 8/1998 |
| EP | 0862349 A2 | 9/1998 |
| EP | 0907300 A2 | 4/1999 |
| FR | 2 725 573 A1 | 4/1996 |
| JP | 4-189023 | 7/1992 |
| WO | WO 98/09473 | 3/1998 |
| WO | WO 99/00938 | 1/1999 |
| WO | WO 99/00939 | 1/1999 |
| WO | WO 99/00944 | 1/1999 |
| WO | WO 99/00945 | 1/1999 |
| WO | WO 99/00948 | 1/1999 |
| WO | WO 99/00949 | 1/1999 |
| WO | WO 99/00950 | 1/1999 |
| WO | WO9900936 A1 | 6/2001 |

OTHER PUBLICATIONS

"Local Area Network Switch Frame Lookup Technique for Increased Speed and Flexibility," 700 IBM Technical Disclosure Bulletin 38(1995) Jul., No. 7, Armonk, NY, US, pp. 221-222.

"Queue Management for Shared Buffer and Shared Multibuffer ATM Switches," Yu-Sheng Lin et al., Department of Electronics Engineering & Institute of Electronics, National Chiao Tung University, Hsinchu, Taiwan, R.O.C., Mar. 24, 1996, pp. 688-695.

"A 622-Mb/s 8×8 ATM Switch Chip Set with Shared Multibuffer Architecture," Harufusa Kondoh et al., 8107 IEEE Journal of Solid-State Circuits 28(1993) Jul., No. 7, New York, US, pp. 808-814.

"Catalyst 8500 CSR Architecture," White Paper XP-002151999, Cisco Systems Inc. 1998, pp. 1-19.

"Computer Networks," A.S. Tanenbaum, Prentice-Hall Int., USA, XP-002147300(1998), Sec. 5.2-Sec. 5.3, pp. 309-320.

* cited by examiner

Fig.5

PROTOCOL CHANNEL MESSAGES

| 30 | 28 | 26 | 24 | 22 | 20 | 18 | 16 | 14 | 12 | 10 | 8 | 6 | 4 | 2 | 0 |
|----|----|----|----|----|----|----|----|----|----|----|----|----|----|----|----|
| OP CODE | I P | I P X | RESERVED | NXT CELL | SRC DEST PORT | | | COS | J | S | E | CRC | P | O | LEN |

| 30 | 28 | 26 | 24 | 22 | 20 | 18 | 16 | 14 | 12 | 10 | 8 | 6 | 4 | 2 | 0 |
|----|----|----|----|----|----|----|----|----|----|----|----|----|----|----|----|
| RESERVED | | | | | | | BC/MC PORTBITMAP | | | | | | | | |

| 30 | 28 | 26 | 24 | 22 | 20 | 18 | 16 | 14 | 12 | 10 | 8 | 6 | 4 | 2 | 0 |
|----|----|----|----|----|----|----|----|----|----|----|----|----|----|----|----|
| U | RES | | | UNTAGGED PORTBITMAP/SRC PORT NUMBER (BIT0..5) | | | | | | | | | | | |

| 30 | 28 | 26 | 24 | 22 | 20 | 18 | 16 | 14 | 12 | 10 | 8 | 6 | 4 | 2 | 0 |
|----|----|----|----|----|----|----|----|----|----|----|----|----|----|----|----|
| CPU OPCODES | | | | | | | TIMESTAMP | | | | | | | | |

Fig.6

SIDE BAND CHANNEL MESSAGES

| 30 | 28 | 26 | 24 | 22 | 20 | 18 | 16 | 14 | 12 | 10 | 8 | 6 | 4 | 2 | 0 |
|----|----|----|----|----|----|----|----|----|----|----|---|---|---|---|---|
| OPCODE ||| DEST PORT / DESTINATION DEV ID ||| SRC PORT ||| DataLen |||| E | ECODE | COS | C |
| ADDRESS ||||||||||||||||
| DATA ||||||||||||||||

Fig. 17 FFP PROGRAMMING FLOW CHART

APPARATUS AND METHOD FOR ENABLING VOICE OVER IP SUPPORT FOR A NETWORK SWITCH

REFERENCE TO RELATED APPLICATIONS

This application claims priority of U.S. Provisional Patent Application Ser. No. 60/152,289, filed on Sep. 3, 1999. Additionally, this application is a Continuation-In-Part application of co-pending U.S. patent application Ser. No. 09/528,434, which was filed on Mar. 17, 2000. The contents of these earlier filed applications are hereby incorporated by reference.

BACKGROUND OF THE INVENTION

1. Field of the Invention

The invention relates to a method and apparatus for high performance switching in local area communications networks such as token ring, ATM, Ethernet, fast Ethernet, and gigabit Ethernet environments, generally known as LANs. In particular, the present invention relates to an apparatus and method for high performance switching in local area communications networks in order to enable effective Voice Over Internet Protocol (VOIP) in a data network. Further, the resent invention relates to a new switching method and architecture in an integrated, modular, single chip solution, which can be implemented on a semiconductor substrate, such as a silicon chip, that is used in a data network to appropriately classify data being transmitted through the network in order to allow priority designated data, such as voice data, to propagate through the data network with minimal delay.

2. Description of the Related Art

In view of the substantial growth of Internet and computer related technologies in recent years, along with the cost associated with telephone services, the desire to use cost effective data networks to transmit voice and/or multimedia information therein has increased dramatically. In particular, the increase in effective data transmission rates through data networks via linespeed network switching has opened the possibility of using data networks for VOIP communications. However, an effective VOIP system is still limited by current data transmission bandwidths and excessive data network congestion that results in unacceptable latency/delays in VOIP transmissions.

Current VOIP systems generally attempt to address the latency problem via classification of VOIP data packets at the initial receiving station for the VOIP data. This classified data is then transmitted to a data network for transmission, with the assumption that the data network will be capable of recognizing the data as VOIP data, and therefore, transmit the data through the network to the destination with minimal propagation delay. However, these types of VOIP systems suffer from compatibility problems, as the data networks transmitting the VOIP data must be able to recognize the priority designation given the VOIP data at the receiving station in order to route the VOIP data through network congestion, such that latency is minimized. Furthermore, compatibility issues also arise with regard to the end stations of the VOIP network, as if users of a VOIP system are not using compatible systems, e.g. those made by the same manufacturer, then the likelihood that a first VOIP user's system will recognize a classification given a VOIP data packet by a second VOIP user's system is decreased. Therefore, in view of the desirability of VOIP systems and the inherent limitations of the present systems, there exists a clear need for a VOIP system capable of transmitting VOIP packets through a network with minimal propagation delay as a result of network congestion. Further, there is a need for such a system that is capable of receiving packets from a plurality of different VOIP applications, regardless of compatibility, and transmitting these VOIP packets to the appropriate destination with minimal delay.

However, the well-known Ethernet technology, which is based upon numerous IEEE Ethernet standards, is an example of computer networking technology that has been able to be modified and improved to remain a viable computing technology. A more complete discussion of prior art networking systems can be found, for example, in SWITCHED AND FAST ETHERNET, by Breyer and Riley (Ziff-Davis, 1996), and numerous IEEE publications relating to IEEE 802 standards. Based upon the Open Systems Interconnect (OSI) 7-layer reference model, network capabilities have grown through the development of repeaters, bridges, routers, and, more recently, "network switches," which operate with various types of communication media. Thickwire, thinwire, twisted pair, and optical fiber are examples of media which has been used for computer networks. Switches, as they relate to computer networking and to Ethernet, are hardware-based devices which control the flow of data packets or cells based upon destination address information which is available in each packet. A properly designed and implemented switch should be capable of receiving a packet and switching the packet to an appropriate output port at what is referred to wirespeed or linespeed, which is the maximum speed capability of the particular network. Basic Ethernet wirespeed is up to 10 megabits per second, and Fast Ethernet is up to 100 megabits per second. The newest Ethernet is referred to as gigabit Ethernet, and is capable of transmitting data over a network at a rate of up to 1,000 megabits per second. As speed has increased, design constraints and design requirements have become more and more complex with respect to following appropriate design and protocol rules and providing a low cost, commercially viable solution. For example, high speed switching requires high speed memory to provide appropriate buffering of packet data; conventional Dynamic Random Access Memory (DRAM) is relatively slow, and requires hardware-driven refresh. The speed of DRAMs, therefore, as buffer memory in network switching, results in valuable time being lost, and it becomes almost impossible to operate the switch or the network at linespeed. Furthermore, external CPU involvement should be minimized, since unnecessary CPU involvement also decreases the possibility of obtaining linespeed switching. Additionally, as network switches have become more and more complicated with respect to requiring rules tables and memory control, a complex multi-chip solution is necessary which requires logic circuitry, sometimes referred to as glue logic circuitry, to enable the various chips to communicate with each other. Additionally, cost/benefit tradeoffs are necessary with respect to expensive but fast SRAMs versus inexpensive but slow DRAMs. Additionally, DRAMs, by virtue of their dynamic nature, require refreshing of the memory contents in order to prevent losses thereof. SRAMs do not suffer from the refresh requirement, and have reduced operational overhead which compared to DRAMs such as elimination of page misses, etc. Although DRAMs have adequate speed when accessing locations on the same page, speed is reduced when other pages must be accessed.

Referring to the OSI 7-layer reference model discussed previously, and illustrated in FIG. 7, the higher layers of the model generally represent a greater content of information.

Various types of products are available for performing switching-related functions at various levels of the OSI model. Hubs or repeaters operate at layer one, and essentially copy and "broadcast" incoming data to a plurality of spokes of the hub. Layer two switching-related devices are typically referred to as multiport bridges, and are capable of bridging two separate networks. Bridges can build a table of forwarding rules based upon which MAC (media access controller) addresses exist on which ports of the bridge, and pass packets which are destined for an address which is located on an opposite side of the bridge. Bridges typically utilize what is known as the "spanning tree" algorithm to eliminate potential data loops; a data loop is a situation wherein a packet endlessly loops in a network looking for a particular address. The spanning tree algorithm defines a protocol for preventing data loops. Layer three switches, sometimes referred to as routers, can forward packets based upon the destination network address. Layer three switches are capable of learning addresses and maintaining tables thereof which correspond to port mappings. Processing speed for layer three switches can be improved by utilizing specialized high performance hardware, and off loading the host CPU so that instruction decisions do not delay packet forwarding.

SUMMARY OF THE INVENTION

The present invention provides a method for switching VOIP packets in a data network, wherein the method includes the steps of receiving a first packet in a network switch and determining if the first packet is a VOIP packet. Further, method includes determining a dynamically negotiated VOIP port for a VOIP session from at least one of the first packet and a second packet received in the network switch, if the first packet is determined to be the VOIP packet. Finally, the method includes the steps of classifying all subsequent VOIP packets corresponding to the dynamically negotiated VOIP port in accordance with predetermined parameters.

The present invention further includes a method for switching VOIP packets, wherein the method includes the steps of filtering packets received in a network switch to trap at least one VOIP call setup message and determining a dynamically negotiated VOIP port. The method further includes the steps of filtering all subsequent packets associated with the dynamically negotiated VOIP port, and taking predefined filtering actions upon the subsequent packets.

The present invention further provides a network switch including at least one data port interface controller supporting a plurality of data ports for transmitting and receiving data, and a fast filtering processor in communication with the at least one data port interface. At least one filtering table in communication with the fast filtering processor is provided, wherein the fast filtering processor is configured to snoop packets being transmitted through the network switch to trap a VOIP call setup message, and thereafter, determine a dynamically negotiated VOIP port so that all subsequent VOIP packets can be filtered and assigned an appropriate priority.

BRIEF DESCRIPTION OF THE DRAWINGS

The objects and features of the invention will be more readily understood with reference to the following description and the attached drawings, wherein:

FIG. 5 illustrates P-channel message types;

FIG. 6 illustrates a message format for S channel message types;

DETAILED DESCRIPTION OF THE PREFERRED EMBODIMENTS

Although VOIP transmissions generally originate and are most effective in a local area network environment, often VOIP transmissions are transmitted across a wide area network to a final destination. As such, when a local network transmits VOIP packets therethrough, the VOIP packets will inherently travel through at least one network switch in traversing the local network. These switches operate to route the VOIP packet towards the final destination. However, the network switches are often congested as a result of high traffic volume in a network, and therefore, the VOIP packets being transmitted through the network may be delayed as a result of the congestion. An object of the present invention is to reduce this delay. Therefore, prior to any discussion of the specific VOIP method and apparatus of the present invention, it is beneficial to discuss an example of a general structure and configuration of a network switch capable of supporting the present invention, however, it should be noted that other switch configurations could be used.

Figure 1:
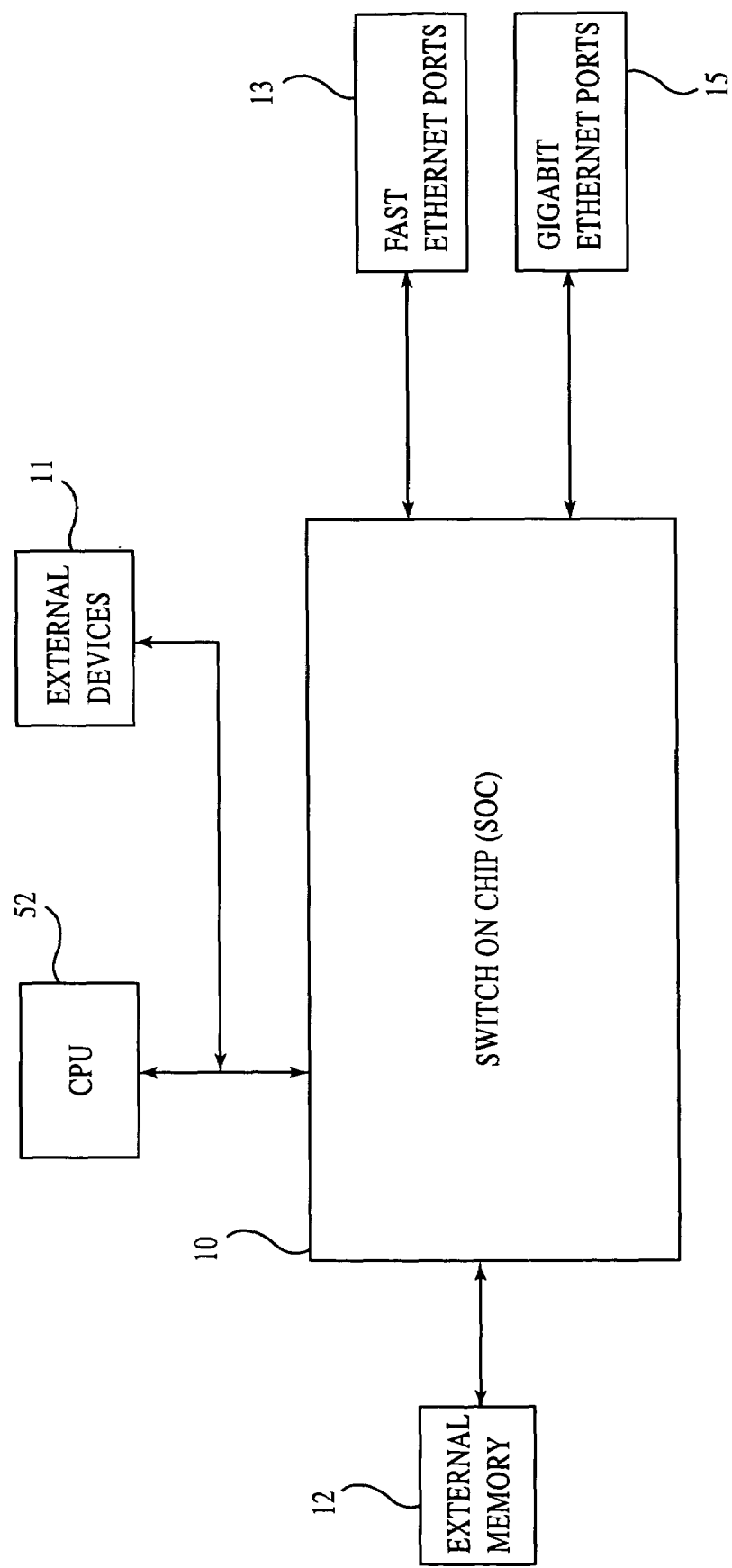
FIG. 1 is a general block diagram of elements of the present invention.

FIG. 1 illustrates an exemplary configuration of a network switch wherein a switch-on-chip (SOC) 10 is functionally connected to external devices 11, external memory 12, fast Ethernet ports 13, and gigabit Ethernet ports 15. For the purposes of this exemplary switch illustration, fast Ethernet ports 13 will be considered low speed Ethernet ports, since they are capable of operating at speeds ranging from 10 Mbps to 100 Mbps, while the gigabit Ethernet ports 15, which are high speed Ethernet ports, are capable of operating at 1000 Mbps. External devices 11 could include other switching devices for expanding switching capabilities, or other devices as may be required by a particular application. External memory 12 is additional off-chip memory, which is in addition to internal memory which is located on SOC 10, as will be discussed below. CPU 52 can be used as necessary to program SOC 10 with rules which are appropriate to control packet processing. However, once SOC 10 is appropriately programmed or configured, SOC 10 operates, as much as possible, in a free running manner without communicating with CPU 52. Because CPU 52 does not control every aspect of the operation of SOC 10, CPU 52 performance requirements, at least with respect to SOC 10, are fairly low. A less powerful and therefore less expensive CPU 52 can therefore be used when compared to other network switches. As also will be discussed below, SOC 10 utilizes external memory 12 in an efficient manner so that the cost and performance requirements of memory 12 can be reduced. Internal memory on SOC 10, as will be discussed below, is also configured to maximize switching throughput and minimize costs. It should be noted that any number of fast Ethernet ports 13 and gigabit Ethernet ports 15 can be provided. In one exemplary configuration of the network switch, a maximum of 24 fast Ethernet ports 13 and 2 gigabit ports 15 can be provided. Similarly, additional interconnect links to additional external devices 11, external memory 12, and CPUs 52 may be provided as necessary.

Figure 2:
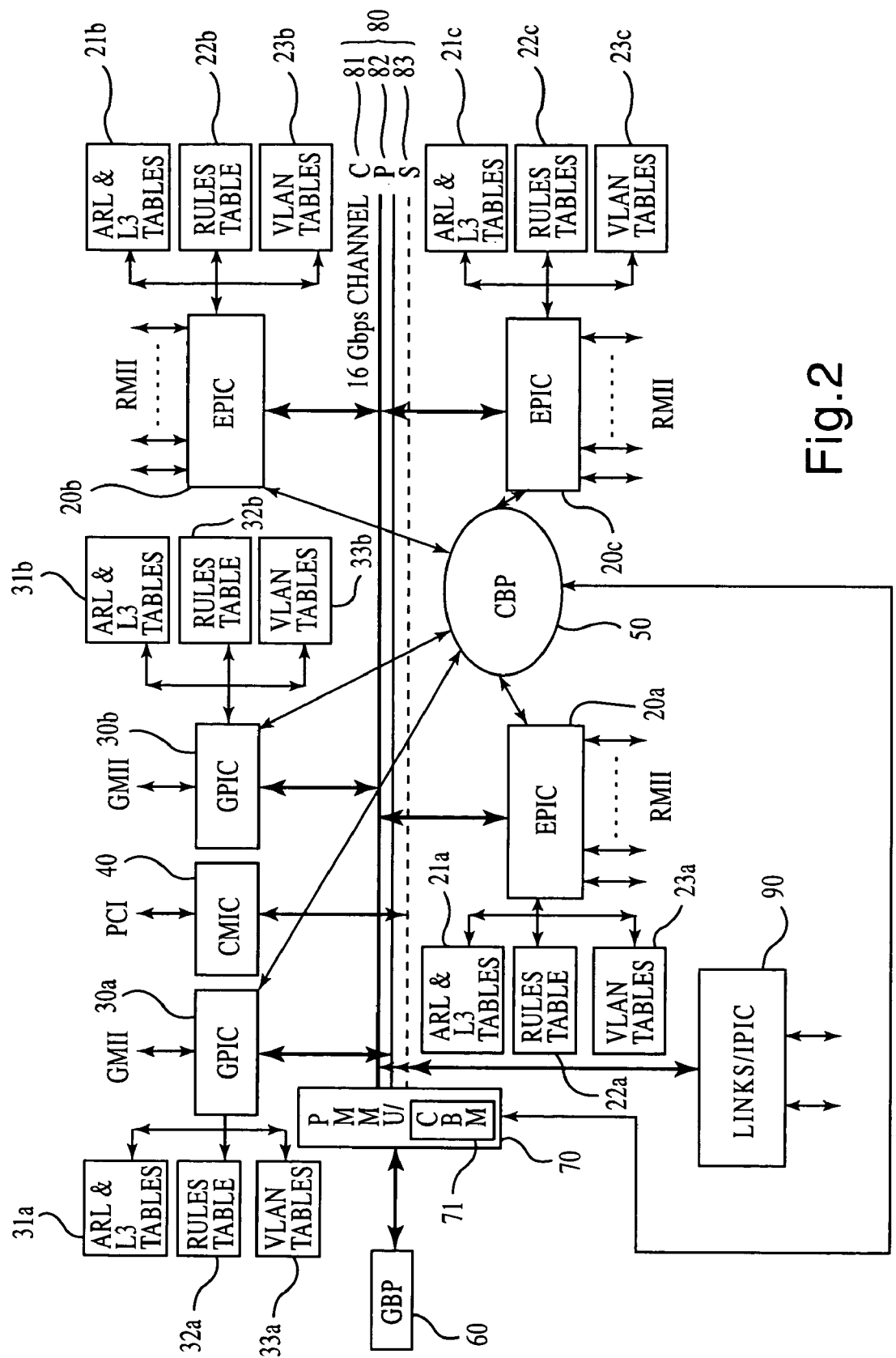
FIG. 2 is a more detailed block diagram of a network switch according to the present invention.

FIG. 2 illustrates a more detailed block diagram of the functional elements of SOC 10. As evident from FIG. 2 and as noted above, the exemplary SOC 10 includes a plurality of modular systems on-chip, with each modular system, although being on the same chip, being functionally separate from other modular systems. Therefore, each module can efficiently operate in parallel with other modules, and this configuration enables a significant amount of freedom in updating and re-engineering SOC 10. SOC 10 includes a plurality of Ethernet Port Interface Controllers (EPIC) 20a, 20b, 20c, etc., a plurality of Gigabit Port Interface Controllers (GPIC) 30a, 30b, etc., a CPU Management Interface Controller (CMIC) 40, a Common Buffer Memory Pool (CBP) 50, a Pipelined Memory Management Unit (PMMU) 70, including a Common Buffer Manager (CBM) 71, and a system-wide bus structure referred to as CPS channel 80. PMMU 70 communicates with external memory 12, which includes a Global Buffer Memory Pool (GBP) 60. The CPS channel 80 comprises C channel 81, P channel 82, and S channel 83. The CPS channel is also referred to as the Cell Protocol Sideband Channel, and is a 17 Gbps channel which glues or interconnects the various modules together. As also illustrated in FIG. 2, other high speed interconnects can be provided, as shown as an extendible high speed interconnect. This interconnect can be in the form of an interconnect port interface controller (IPIC) 90, which is capable of interfacing CPS channel 80 to external devices 11 through an extendible high speed interconnect link. As will be discussed below, each EPIC 20a, 20b, and 20c, generally referred to as EPIC 20, and GPIC 30a and 30b, generally referred to as GPIC 30, are closely interrelated with appropriate address resolution logic and layer three switching tables 21a, 21b, 21c, 31a, 31b, rules tables 22a, 22b, 22c, 31a, 31b, and VLAN tables 23a, 23b, 23c, 31a, 31b. These tables will be generally referred to as 21, 31, 22, 32, 23, 33, respectively. These tables, like other tables on SOC 10, are implemented in silicon as two-dimensional arrays.

In the exemplary network switch EPIC 20 supports 8 fast Ethernet ports 13, and switches packets to and/or from these ports as may be appropriate. The ports, therefore, are connected to the network medium (coaxial, twisted pair, fiber, etc.) using known media connection technology, and communicates with the CPS channel 80 on the other side thereof. The interface of each EPIC 20 to the network medium can be provided through a Reduced Media Internal Interface (RMII), which enables the direct medium connection to SOC 10. As is known in the art, auto-negotiation is an aspect of fast Ethernet, wherein the network is capable of negotiating a highest communication speed between a source and a destination based on the capabilities of the respective devices. The communication speed can vary, as noted previously, between 10 Mbps and 100 Mbps; auto negotiation capability, therefore, is built directly into each EPIC module. The address resolution logic (ARL) and layer three tables (ARL/L3) 21a, 21b, 21c, rules table 22a, 22b, 22c, and VLAN tables 23a, 23b, and 23c are configured to be part of or interface with the associated EPIC in an efficient and expedient manner, also to support wirespeed packet flow.

Each EPIC 20 has separate ingress and egress functions. On the ingress side, self-initiated and CPU-initiated learning of level 2 address information can occur. Address resolution logic is utilized to assist in this task. Address aging is built in as a feature, in order to eliminate the storage of address information which is no longer valid or useful. The EPIC also carries out layer 2 mirroring. A fast filtering processor (FFP) 141 (see FIG. 14) is incorporated into the EPIC, in order to accelerate packet forwarding and enhance packet flow. The ingress side of each EPIC and GPIC, illustrated in FIG. 8 as ingress submodule 14, has a significant amount of complexity to be able to properly process a significant number of different types of packets which may come in to the port, for linespeed buffering and then appropriate transfer to the egress. Functionally, each port on each module of SOC 10 has a separate ingress submodule 14 associated therewith. From an implementation perspective, however, in order to minimize the amount of hardware implemented on the single-chip SOC 10, common hardware elements in the silicon can be used to implement a plurality of ingress submodules on each particular module. The configuration of SOC 10 discussed herein enables concurrent lookups and filtering, and therefore, processing of up to 6.6 million packets per second. Layer two lookups, Layer three lookups and filtering occur simultaneously to achieve this level of performance. On the egress side, the EPIC is capable of supporting packet polling based either as an egress management or class of service (COS) function. Rerouting/scheduling of packets to be transmitted can occur, as well as head-of-line (HOL) blocking notification, packet aging, cell reassembly, and other functions associated with Ethernet port interface.

Each GPIC 30 is similar to each EPIC 20, but supports only one gigabit Ethernet port, and utilizes a port-specific ARL table, rather than utilizing an ARL table which is shared with any other ports. Additionally, instead of an RMII, each GPIC port interfaces to the network medium utilizing a gigabit media independent interface (GMII).

CMIC 40 acts as a gateway between the SOC 10 and the host CPU. The communication can be, for example, along a PCI bus, or other acceptable communications bus. CMIC 40 can provide sequential direct mapped accesses between the host CPU 52 and the SOC 10. CPU 52, through the CMIC 40, will be able to access numerous resources on SOC 10, including MIB counters, programmable registers, status and control registers, configuration registers, ARL tables, port-based VLAN tables, IEEE 802.1q VLAN tables, layer three tables, rules tables, CBP address and data memory, as well as GBP address and data memory. Optionally, the CMIC 40 can include DMA support, DMA chaining and scatter-gather, as well as master and target PCI64.

Common buffer memory pool or CBP 50 can be considered to be the on-chip data memory. In one configuration of the exemplary network switch, the CBP 50 is first level high speed SRAM memory, to maximize performance and minimize hardware overhead requirements. The CBP can have a size of, for example, 720 kilobytes running at 132 MHz. Packets stored in the CBP 50 are typically stored as cells, rather than packets. As illustrated in the figure, PMMU 70 also contains the Common Buffer Manager (CBM) 71 thereupon. CBM 71 handles queue management, and is responsible for assigning cell pointers to incoming cells, as well as assigning common packet IDs (CPID) once the packet is fully written into the CBP. CBM 71 can also handle management of the on-chip free address pointer pool, control actual data transfers to and from the data pool, and provide memory budget management.

Global memory buffer pool or GBP 60 acts as a second level memory, and can be located on-chip or off chip. In the exemplary switch configuration, GBP 60 is located off chip with respect to SOC 10. When located off-chip, GBP 60 is considered to be a part of or all of external memory 12. As a second level memory, the GBP does not need to be expensive high speed SRAMs, and can be a slower less expensive memory such as DRAM. The GBP is tightly coupled to the PMMU 70, and operates like the CBP in that packets are stored as cells. For broadcast and multicast messages, only one copy of the packet is stored in GBP 60.

As shown in the figure, PMMU 70 is located between GBP 60 and CPS channel 80, and acts as an external memory interface. In order to optimize memory utilization, PMMU 70 includes multiple read and write buffers, and supports numerous functions including global queue management, which broadly includes assignment of cell pointers for rerouted incoming packets, maintenance of the global FAP, time-optimized cell management, global memory budget management, GPID assignment and egress manager notification, write buffer management, read prefetches based upon egress manager/class of service requests, and smart memory control.

As shown in FIG. 2, the CPS channel 80 is actually three separate channels, referred to as the C-channel, the P-channel, and the S-channel. The C-channel is 128 bits wide, and runs at 132 MHz. Packet transfers between ports occur on the C-channel. Since this channel is used solely for data transfer, there is no overhead associated with its use. The P-channel or protocol channel is synchronous or locked with the C-channel. During cell transfers, the message header is sent via the P-channel by the PMMU. The P-channel is 32 bits wide, and runs at 132 MHz.

The S or sideband channel runs at 132 MHz, and is 32 bits wide. The S-channel is used for functions such as conveying Port Link Status, receive port full, port statistics, ARL table synchronization, memory and register access to CPU and other CPU management functions, and global memory full and common memory full notification.

Figure 3:
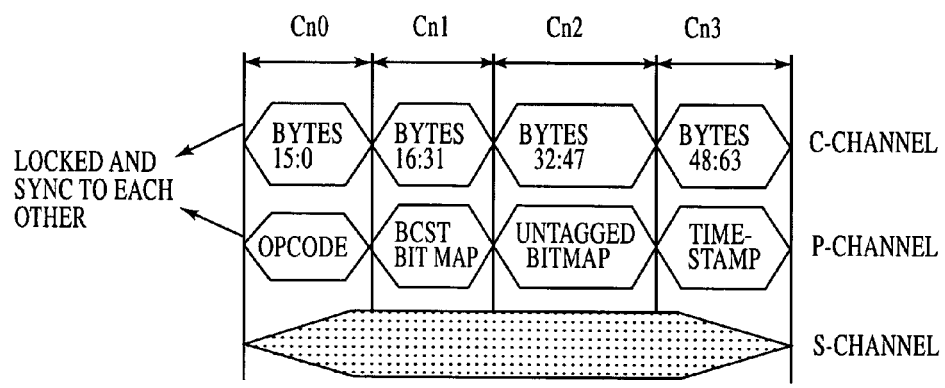
FIG. 3 illustrates the data flow on the CPS channel of a network switch according to the present invention.

A proper understanding of the operation of an SOC 10 requires a proper understanding of the operation of CPS channel 80. Referring to FIG. 3, it can be seen that in SOC 10, on the ingress, packets are sliced by an EPIC 20 or GPIC 30 into 64-byte cells. The use of cells on-chip instead of packets makes it easier to adapt the SOC to work with cell based protocols such as, for example, Asynchronous Transfer Mode (ATM). Presently, however, ATM utilizes cells which are 53 bytes long, with 48 bytes for payload and 5 bytes for header. In the SOC, incoming packets are sliced into cells which are 64 bytes long as discussed above, and the cells are further divided into four separate 16 byte cell blocks Cn0 . . . Cn3. Locked with the C-channel is the P-channel, which locks the opcode in synchronization with Cn0. A port bit map is inserted into the P-channel during the phase Cn1. The untagged bit map is inserted into the P-channel during phase Cn2, and a time stamp is placed on the P-channel in Cn3. Independent from occurrences on the C and P-channel, the S-channel is used as a sideband, and is therefore decoupled from activities on the C and P-channel.

Cell or C-Channel

Figure 4A:
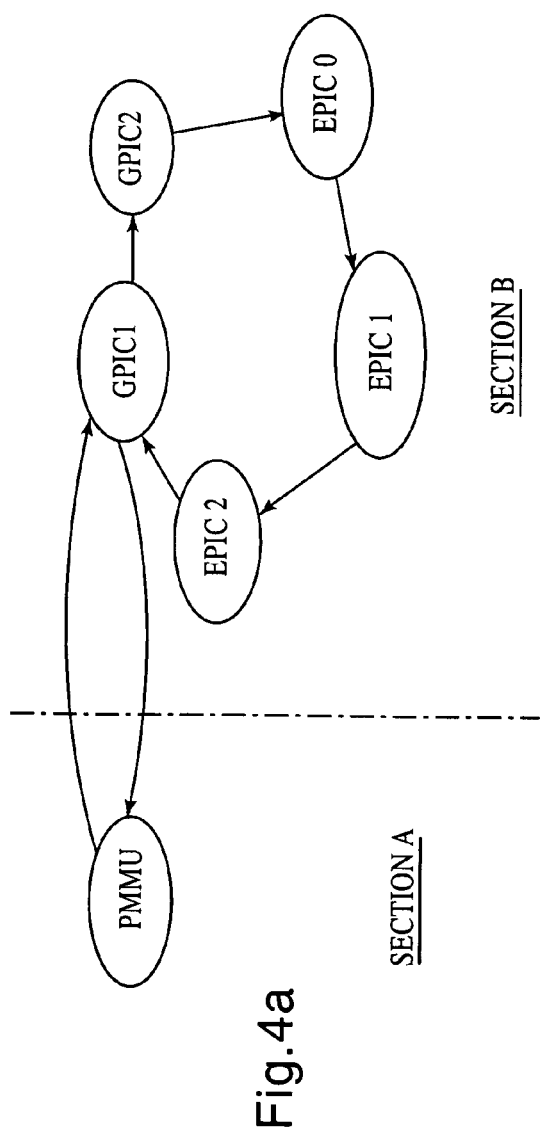
FIG. 4A illustrates demand priority round robin arbitration for access to the C-channel of the network switch.
Figure 4B:
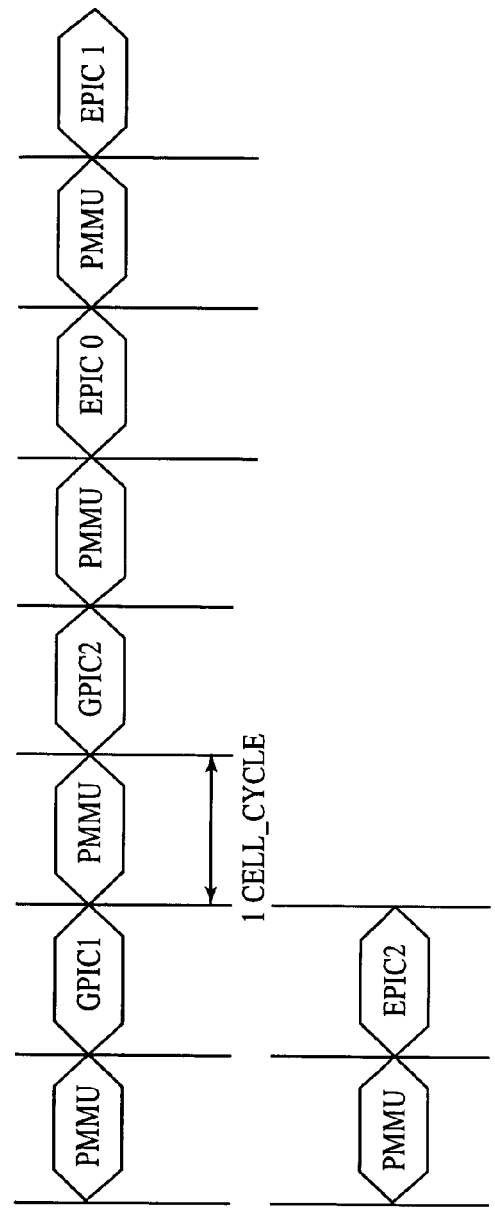
FIG. 4B illustrates access to the C-channel based upon the round robin arbitration illustrated in FIG. 4A.
Figure 7:
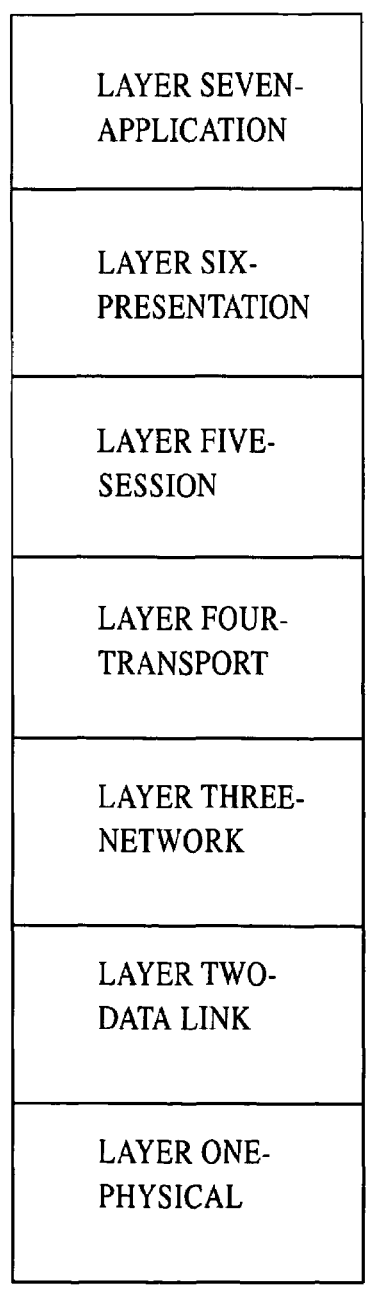
FIG. 7 is an illustration of the OSI 7 layer reference model.

Arbitration for the CPS channel occurs out of band. Every module (EPIC, GPIC, etc.) monitors the channel, and matching destination ports respond to appropriate transactions. C-channel arbitration is a demand priority round robin arbitration mechanism. If no requests are active, however, the default module, which can be selected during the configuration of SOC 10, can park on the channel and have complete access thereto. If all requests are active, the configuration of SOC 10 is such that the PMMU is granted access every other cell cycle, and EPICs 20 and GPICs 30 share equal access to the C-channel on a round robin basis. FIGS. 4A and 4B illustrate a C-channel arbitration mechanism wherein section A is the PMMU, and section B consists of two GPICs and three EPICs. The sections alternate access, and since the PMMU is the only module in section A, it gains access every other cycle. The modules in section B, as noted previously, obtain access on a round robin basis.

Protocol or P-Channel

Referring once again to the protocol or P-channel, a plurality of messages can be placed on the P-channel in order to properly direct flow of data flowing on the C-channel. Since P-channel 82 is 32 bits wide, and a message typically requires 128 bits, four smaller 32 bit messages are put together in order to form a complete P-channel message. The following list identifies the fields and function and the various bit counts of the 128 bit message on the P-channel.

Opcode—2 bits long—Identifies the type of message present on the C channel 81;

IP Bit—1 bit long—This bit is set to indicate that the packet is an IP switched packet;

IPX Bit—1 bit long—This bit is set to indicate that the packet is an IPX switched packet;

Next Cell—2 bits long—A series of values to identify the valid bytes in the corresponding cell on the C channel 81;

SRC DEST Port—6 bits long—Defines the port number which sends the message or receives the message, with the interpretation of the source or destination depending upon Opcode;

Cos—3 bits long—Defines class of service for the current packet being processed;

J—1 bit long—Describes whether the current packet is a jumbo packet;

S—1 bit long—Indicates whether the current cell is the first cell of the packet;

E—1 bit long—Indicates whether the current cell is the last cell of the packet; CRC —2 bits long—Indicates whether a Cyclical Redundancy Check (CRC) value should be appended to the packet and whether a CRC value should be regenerated;

P Bit—1 bit long—Determines whether MMU should Purge the entire packet;

Len—7 bytes—Identifies the valid number of bytes in current transfer;

O—2 bits—Defines an optimization for processing by the CPU 52; and

Bc/Mc Bitmap—28 bits—Defines the broadcast or multicast bitmap.

Identifies egress ports to which the packet should be set, regarding multicast and broadcast messages.

Untag Bits/Source Port—28/5 bits long—Depending upon Opcode, the packet is transferred from Port to MMU, and this field is interpreted as the untagged bit map. A different Opcode selection indicates that the packet is being transferred from MMU to egress port, and the last six bits of this field is interpreted as the Source Port field. The untagged bits identifies the egress ports which will strip the tag header, and the source port bits identifies the port number upon which the packet has entered the switch;

U Bit—1 bit long—For a particular Opcode selection (0×01, this bit being set indicates that the packet should leave the port as Untagged; in this case, tag stripping is performed by the appropriate MAC;

CPU Opcode—18 bits long—These bits are set if the packet is being sent to the CPU for any reason. Opcodes are defined based upon filter match, learn bits being set, routing bits, destination lookup failure (DLF), station movement, etc;

Time Stamp—14 bits—The system puts a time stamp in this field when the packet arrives, with a granularity of 1 psec.

The opcode field of the P-channel message defines the type of message currently being sent. While the opcode is currently shown as having a width of 2 bits, the opcode field can be widened as desired to account for new types of messages as may be defined in the future. Graphically, however, the P-channel message type defined above is shown in FIG. 5.

An early termination message is used to indicate to CBM 71 that the current packet is to be terminated. During operation, as discussed in more detail below, the status bit (S) field in the message is set to indicate the desire to purge the current packet from memory. Also in response to the status bit all applicable egress ports would purge the current packet prior to transmission.

The Src Dest Port field of the P-channel message, as stated above, define the destination and source port addresses, respectively. Each field is 6 bits wide and therefore allows for the addressing of sixty-four ports.

The CRC field of the message is two bits wide and defines CRC actions. Bit 0 of the field provides an indication whether the associated egress port should append a CRC to the current packet. An egress port would append a CRC to the current packet when bit 0 of the CRC field is set to a logical one. Bit 1 of the CRC field provides an indication whether the associated egress port should regenerate a CRC for the current packet. An egress port would regenerate a CRC when bit 1 of the CRC field is set to a logical one. The CRC field is only valid for the last cell transmitted as defined by the E bit field of P-channel message set to a logical one.

As with the CRC field, the status bit field (st), the Len field, and the Cell Count field of the message are only valid for the last cell of a packet being transmitted as defined by the E bit field of the message.

Last, the time stamp field of the message has a resolution of 1 μs and is valid only for the first cell of the packet defined by the S bit field of the message. A cell is defined as the first cell of a received packet when the S bit field of the message is set to a logical one value.

As is described in more detail below, the C channel 81 and the P channel 82 are synchronously tied together such that data on C channel 81 is transmitted over the CPS channel 80 while a corresponding P channel message is simultaneously transmitted.

S-Channel or Sideband Channel

The S channel 83 is a 32-bit wide channel which provides a separate communication path within the SOC 10. The S channel 83 is used for management by CPU 52, SOC 10 internal flow control, and SOC 10 inter-module messaging. The S channel 83 is a sideband channel of the CPS channel 80, and is electrically and physically isolated from the C channel 81 and the P channel 82. It is important to note that since the S channel is separate and distinct from the C channel 81 and the P channel 82, operation of the S channel 83 can continue without performance degradation related to the C channel 81 and P channel 82 operation. Conversely, since the C channel is not used for the transmission of system messages, but rather only data, there is no overhead associated with the C channel 81 and, thus, the C channel 81 is able to free-run as needed to handle incoming and outgoing packet information.

The S channel 83 of CPS channel 80 provides a system wide communication path for transmitting system messages, for example, providing the CPU 52 with access to the control structure of the SOC 10. System messages include port status information, including port link status, receive port full, and port statistics, ARL table 22 synchronization, CPU 52 access to GBP 60 and CBP 50 memory buffers and SOC 10 control registers, and memory full notification corresponding to GBP 60 and/or CBP 50.

FIG. 6 illustrates a message format for an S channel message on S channel 83. The message is formed of four 32-bit words; the bits of the fields of the words are defined as follows:

Opcode—6 bits long—Identifies the type of message present on the S channel;

Dest Port—6 bits long—Defines the port number to which the current S channel message is addressed;

Src Port—6 bits long—Defines the port number of which the current S channel message originated;

COS—3 bits long—Defines the class of service associated with the current S channel message; and C bit—1 bit long—Logically defines whether the current S channel message is intended for the CPU 52.

Error Code—2 bits long—Defines a valid error when the E bit is set;

DataLen—7 bits long—Defines the total number of data bytes in the Data field;

E bit—1 bit long—Logically indicates whether an error has occurred in the execution of the current command as defined by opcode;

Address—32 bits long—Defines the memory address associated with the current command as defined in opcode;

Data—0-127 bits long—Contains the data associated with the current opcode.

With the configuration of CPS channel 80 as explained above, the decoupling of the S channel from the C channel and the P channel is such that the bandwidth on the C channel can be preserved for cell transfer, and that overloading of the C channel does not affect communications on the sideband channel.

SOC Operation

The configuration of the exemplary SOC 10 supports fast Ethernet ports, gigabit ports, and extendible interconnect links as discussed above. The SOC configuration can also be "stacked", thereby enabling significant port expansion capability. Once data packets have been received by SOC 10, sliced into cells, and placed on CPS channel 80, stacked SOC modules can interface with the CPS channel and monitor the channel, and extract appropriate information as necessary. As will be discussed below, a significant amount of concurrent lookups and filtering occurs as the packet comes in to ingress submodule 14 of an EPIC 20 or GPIC 30, with respect to layer two and layer three lookups, and fast filtering.

Figure 8:
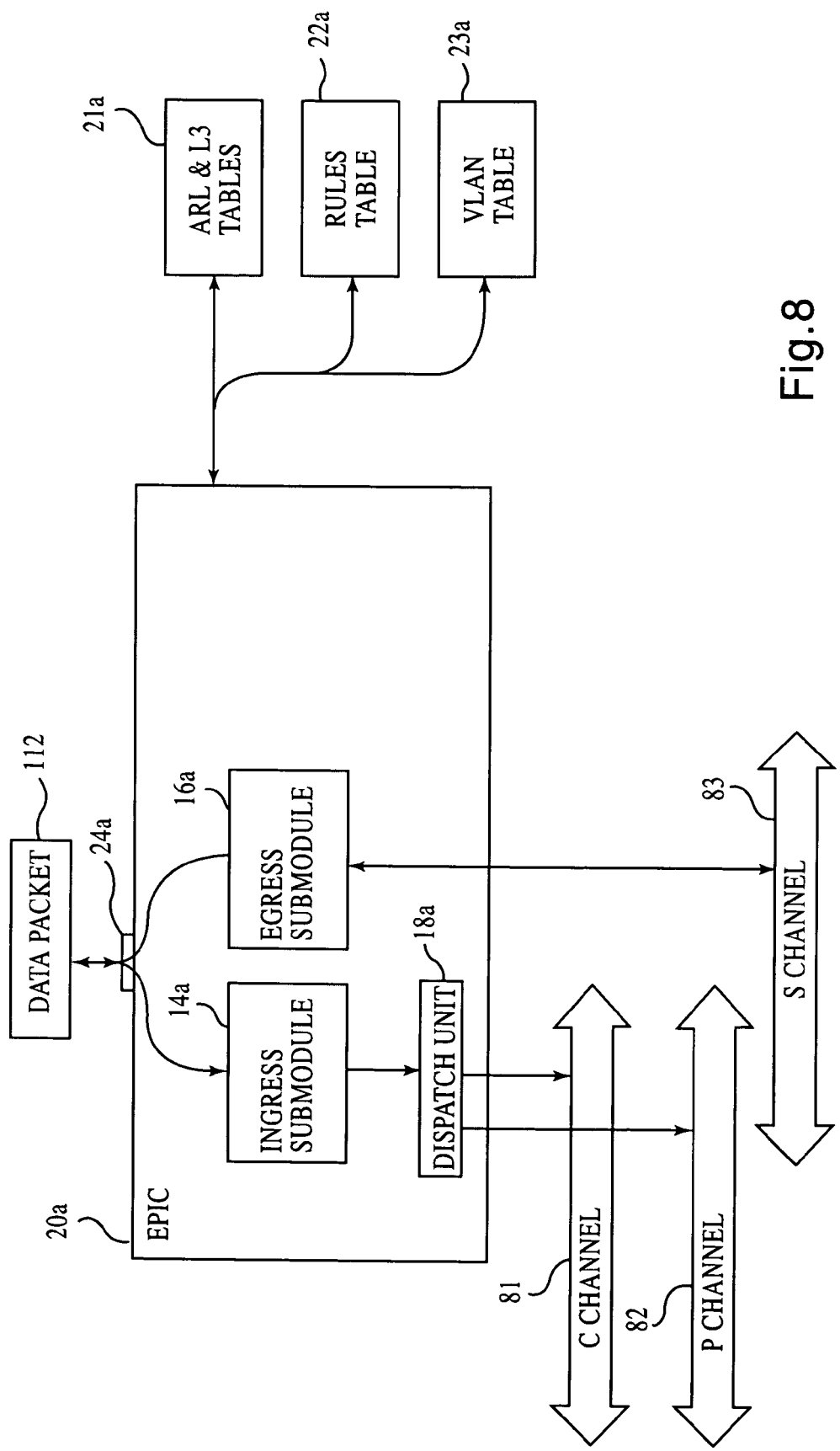
FIG. 8 illustrates an operational diagram of an EPIC module.
Figure 9:
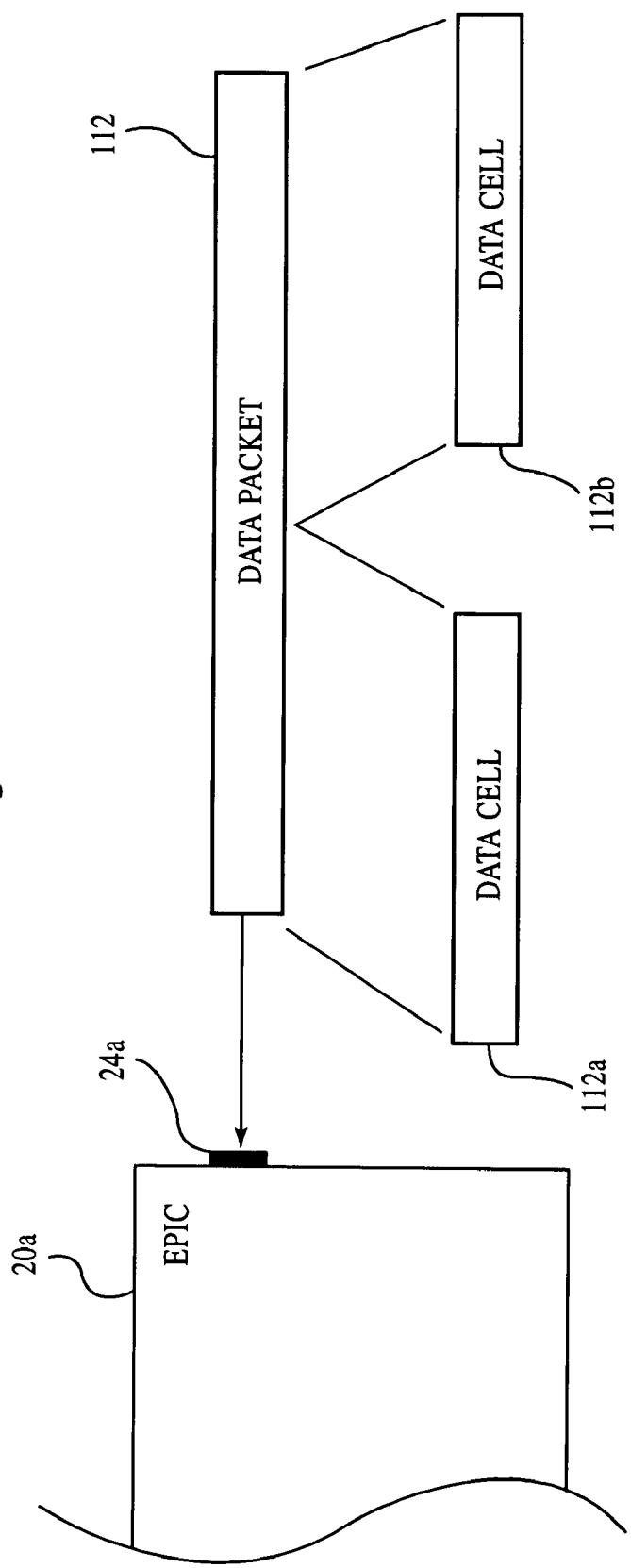
FIG. 9 illustrates the slicing of a data packet on the ingress to an EPIC module.

Now referring to FIGS. 8 and 9, the handling of a data packet is described. For explanation purposes, Ethernet data to be received will consider to arrive at one of the ports 24a of EPIC 20a. It will be presumed that the packet is intended to be transmitted to a user on one of ports 24c of EPIC 20c. All EPICs 20 (20a, 20b, 20c, etc.) have similar features and functions, and each individually operate based on packet flow.

An input data packet 112 is applied to the port 24a is shown. The data packet 112 is, in this example, defined per the current standards for 10/100 Mbps Ethernet transmission and may have any length or structure as defined by that standard. This discussion will assume the length of the data packet 112 to be 1024 bits or 128 bytes.

When the data packet 112 is received by the EPIC module 20a, an ingress sub-module 14a, as an ingress function, determines the destination of the packet 112. The first 64 bytes of the data packet 112 is buffered by the ingress sub-module 14a and compared to data stored in the lookup tables 21a to determine the destination port 24c. Also as an ingress function, the ingress sub-module 14a slices the data packet 112 into a number of 64-byte cells; in this case, the 128 byte packet is sliced in two 64 byte cells 112a and 112b. While the data packet 112 is shown in this example to be exactly two 64-byte cells 112a and 112b, an actual incoming data packet may include any number of cells, with at least one cell of a length less than 64 bytes. Padding bytes are used to fill the cell. In such cases the ingress sub-module 14a disregards the padding bytes within the cell. Further discussions of packet handling will refer to packet 112 and/or cells 112a and 112b.

It should be noted that each EPIC 20 (as well as each GPIC 30) has an ingress submodule 14 and egress submodule 16, which provide port specific ingress and egress functions. All incoming packet processing occurs in ingress sub-module 14, and features such as the fast filtering processor, layer two (L2) and layer three (L3) lookups, layer two learning, both self-initiated and CPU 52 initiated, layer two table management, layer two switching, packet slicing, and channel dispatching occurs in ingress submodule 14. After lookups, fast filter processing, and slicing into cells, as noted above and as will be discussed below, the packet is placed from ingress submodule 14 into dispatch unit 18, and then placed onto CPS channel 80 and memory management is handled by PMMU 70. A number of ingress buffers are provided in dispatch unit 18 to ensure proper handling of the packets/cells. Once the cells or cellularized packets are placed onto the CPS channel 80, the ingress submodule is finished with the packet. The ingress is not involved with dynamic memory allocation, or the specific path the cells will take toward the destination. Egress submodule 16, illustrated in FIG. 8 as submodule 16a of EPIC 20a, monitors CPS channel 80 and continuously looks for cells destined for a port of that particular EPIC 20. When the PMMU 70 receives a signal that an egress associated with a destination of a packet in memory is ready to receive cells, PMMU 70 pulls the cells associated with the packet out of the memory, as will be discussed below, and places the cells on CPS channel 80, destined for the appropriate egress submodule. A FIFO in the egress submodule 16 continuously sends a signal onto the CPS channel 80 that it is ready to receive packets, when there is room in the FIFO for packets or cells to be received. As noted previously, the CPS channel 80 is configured to handle cells, but cells of a particular packet are always handled together to avoid corrupting of packets. In order to overcome data flow degradation problems associated with overhead usage of the C channel 81, all L2 learning and L2 table management is achieved through the use of the S channel 83. L2 self-initiated learning is achieved by deciphering the source address of a user at a given ingress port 24 utilizing the packet's associated address. Once the identity of the user at the ingress port 24 is determined, the ARL/L3 tables 21a are updated to reflect the user identification. The ARL/L3 tables 21 of each other EPIC 20 and GPIC 30 are updated to reflect the newly acquired user identification in a synchronizing step, as will be discussed below. As a result, while the ingress of EPIC 20a may determine that a given user is at a given port 24a, the egress of EPIC 20b, whose table 21b has been updated with the user's identification at port 24a, can then provide information to the User at port 24a without re-learning which port the user was connected.

Table management may also be achieved through the use of the CPU 52. CPU 52, via the CMIC 40, can provide the SOC 10 with software functions which result in the designation of the identification of a user at a given port 24. As discussed above, it is undesirable for the CPU 52 to access the packet information in its entirety since this would lead to performance degradation. Rather, the SOC 10 is programmed by the CPU 52 with identification information concerning the user. The SOC 10 can maintain real-time data flow since the table data communication between the CPU 52 and the SOC 10 occurs exclusively on the S channel 83. While the SOC 10 can provide the CPU 52 with direct packet information via the C channel 81, such a system setup is undesirable for the reasons set forth above. As stated above, as an ingress function an address resolution lookup is performed by examining the ARL table 21a. If the packet is addressed to one of the layer three (L3) switches of the SOC 10, then the ingress sub-module 14a performs the L3 and default table lookup. Once the destination port has been determined, the EPIC 20a sets a ready flag in the dispatch unit 18a which then arbitrates for C channel 81.

The C channel 81 arbitration scheme, as discussed previously and as illustrated in FIGS. 4A and 4B, is Demand Priority Round-Robin. Each I/O module, EPIC 20, GPIC 30, and CMIC 40, along with the PMMU 70, can initiate a request for C channel access. If no requests exist at any one given time, a default module established with a high priority gets complete access to the C channel 81. If any one single I/O module or the PMMU 70 requests C channel 81 access, that single module gains access to the C channel 81 on-demand.

If EPIC modules 20*a*, 20*b*, 20*c*, and GPIC modules 30*a* and 30*b*, and CMIC 40 simultaneously request C channel access, then access is granted in round-robin fashion. For a given arbitration time period each of the I/O modules would be provided access to the C channel 81. For example, each GPIC module 30*a* and 30*b* would be granted access, followed by the EPIC modules, and finally the CMIC 40. After every arbitration time period the next I/O module with a valid request would be given access to the C channel 81. This pattern would continue as long as each of the I/O modules provide an active C channel 81 access request.

If all the I/O modules, including the PMMU 70, request C channel 81 access, the PMMU 70 is granted access as shown in FIG. 4B since the PMMU provides a critical data path for all modules on the switch. Upon gaining access to the channel 81, the dispatch unit 18*a* proceeds in passing the received packet 112, one cell at a time, to C channel 81.

Referring again to FIG. 3, the individual C, P, and S channels of the CPS channel 80 are shown. Once the dispatch unit 18*a* has been given permission to access the CPS channel 80, during the first time period Cn0, the dispatch unit 18*a* places the first 16 bytes of the first cell 112*a* of the received packet 112 on the C channel 81. Concurrently, the dispatch unit 18*a* places the first P channel message corresponding to the currently transmitted cell. As stated above, the first P channel message defines, among other things, the message type. Therefore, this example is such that the first P channel message would define the current cell as being a unicast type message to be directed to the destination egress port 21*c*.

During the second clock cycle Cn1, the second 16 bytes (16:31) of the currently transmitted data cell 112*a* are placed on the C channel 81. Likewise, during the second clock cycle Cn1, the B/cMc Port Bitmap is placed on the P channel 82.

As indicated by the hatching of the S channel 83 data during the time periods Cn0 to Cn3 in FIG. 3, the operation of the S channel 83 is decoupled from the operation of the C channel 81 and the P channel 82. For example, the CPU 52, via the CMIC 40, can pass system level messages to non-active modules while an active module passes cells on the C channel 81. As previously stated, this is an important aspect of the SOC 10 since the S channel operation allows parallel task processing, permitting the transmission of cell data on the C channel 81 in real-time. Once the first cell 112*a* of the incoming packet 112 is placed on the CPS channel 80 the PMMU 70 determines whether the cell is to be transmitted to an egress port 21 local to the SOC 10. If the PMMU 70 determines that the current cell 112*a* on the C channel 81 is destined for an egress port of the SOC 10, the PMMU 70 takes control of the cell data flow.

Figure 10:
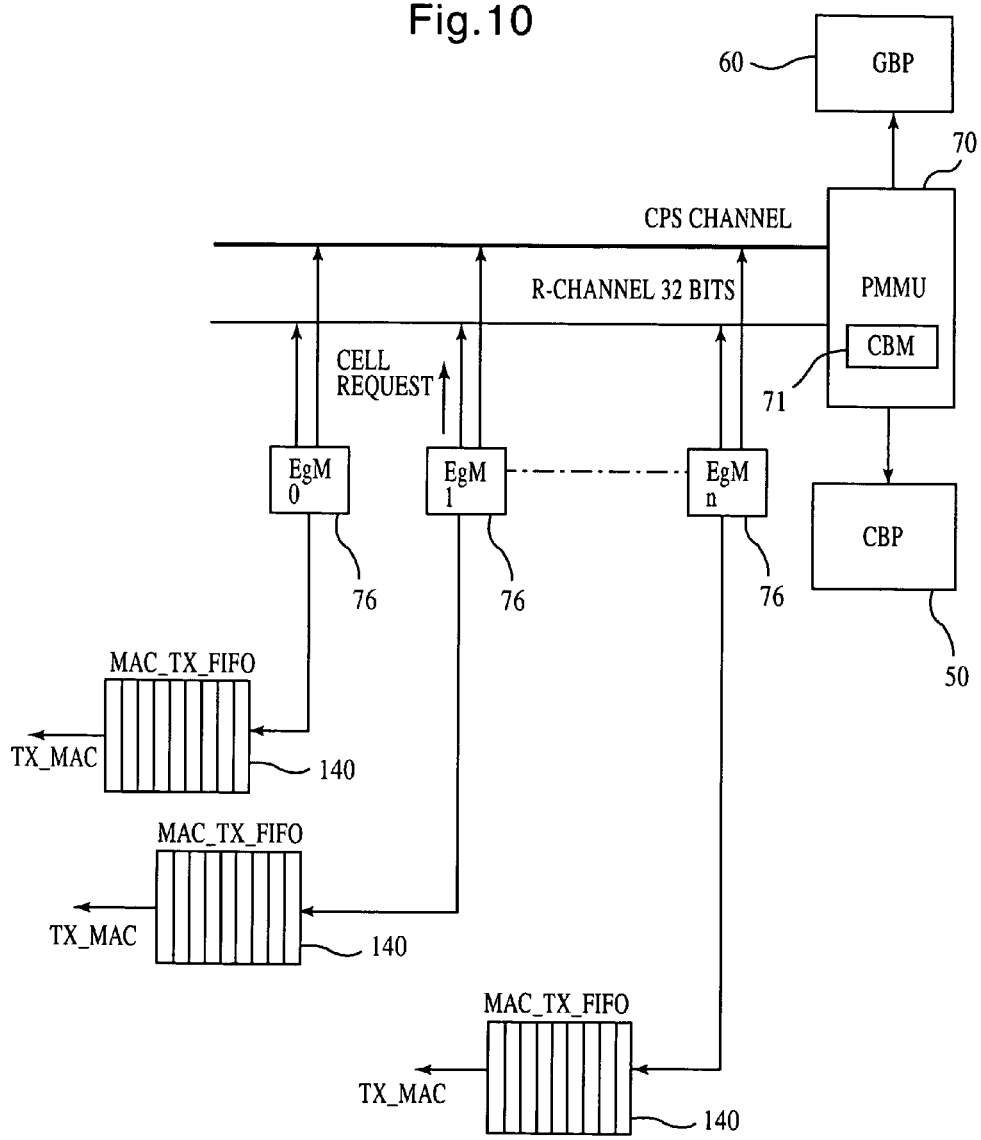
FIG. 10 is a detailed view of elements of the PMMU.

FIG. 10 illustrates, in more detail, the functional egress aspects of PMMU 70. PMMU 70 includes CBM 71, and interfaces between the GBP, CBP and a plurality of egress managers (EgM) 76 of egress submodule 18, with one egress manager 76 being provided for each egress port. CBM 71 is connected to each egress manager 76, in a parallel configuration, via R channel data bus 77. R channel data bus 77 is a 32-bit wide bus used by CBM 71 and egress managers 76 in the transmission of memory pointers and system messages. Each egress manager 76 is also connected to CPS channel 80, for the transfer of data cells 112*a* and 112*b*.

Figure 11:
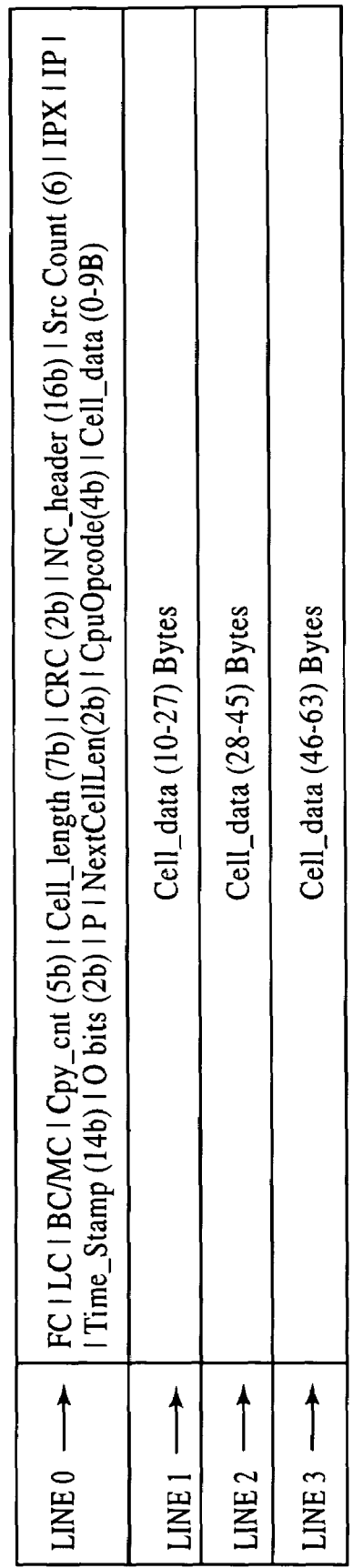
FIG. 11 illustrates the CBM cell format.

CBM 71, in summary, performs the functions of on-chip FAP (free address pool) management, transfer of cells to CBP 50, packet assembly and notification to the respective egress managers, rerouting of packets to GBP 60 via a global buffer manager, as well as handling packet flow from the GBP 60 to CBP 50. Memory clean up, memory budget management, channel interface, and cell pointer assignment are also functions of CBM 71. With respect to the free address pool, CBM 71 manages the free address pool and assigns free cell pointers to incoming cells. The free address pool is also written back by CBM 71, such that the released cell pointers from various egress managers 76 are appropriately cleared. Assuming that there is enough space available in CBP 50, and enough free address pointers available, CBM 71 maintains at least two cell pointers per egress manager 76 which is being managed. The first cell of a packet arrives at an egress manager 76, and CBM 71 writes this cell to the CBM memory allocation at the address pointed to by the first pointer. In the next cell header field, the second pointer is written. The format of the cell as stored in CBP 50 is shown in FIG. 11; each line is 18 bytes wide. Line 0 contains appropriate information with respect to first cell and last cell information, broadcast/multicast, number of egress ports for broadcast or multicast, cell length regarding the number of valid bytes in the cell, the next cell pointer, total cell count in the packet, and time stamp. The remaining lines contain cell data as 64 byte cells. The free address pool within PMMU 70 stores all free pointers for CBP 50. Each pointer in the free address pool points to a 64-byte cell in CBP 50; the actual cell stored in the CBP is a total of 72 bytes, with 64 bytes being byte data, and 8 bytes of control information. Functions such as HOL blocking high and low watermarks, out queue budget registers, CPID assignment, and other functions are handled in CBM 71, as explained herein.

When PMMU 70 determines that cell 112*a* is destined for an appropriate egress port on SOC 10, PMMU 70 controls the cell flow from CPS channel 80 to CBP 50. As the data packet 112 is received at PMMU 70 from CPS 80, CBM 71 determines whether or not sufficient memory is available in CBP 50 for the data packet 112. A free address pool (not shown) can provide storage for at least two cell pointers per egress manager 76, per class of service. If sufficient memory is available in CBP 50 for storage and identification of the incoming data packet, CBM 71 places the data cell information on CPS channel 80. The data cell information is provided by CBM 71 to CBP 50 at the assigned address. As new cells are received by PMMU 70, CBM 71 assigns cell pointers. The initial pointer for the first cell 112*a* points to the egress manager 76 which corresponds to the egress port to which the data packet 112 will be sent after it is placed in memory. In the example of FIG. 8, packets come in to port 24*a* of EPIC 20*a*, and are destined for port 24*c* of EPIC 20*c*. For each additional cell 112*b*, CBM 71 assigns a corresponding pointer. This corresponding cell pointer is stored as a two byte or 16 bit value NC_header, in an appropriate place on a control message, with the initial pointer to the corresponding egress manager 76, and successive cell pointers as part of each cell header, a linked list of memory pointers is formed which defines packet 112 when the packet is transmitted via the appropriate egress port, in this case 24*c*. Once the packet is fully written into CBP 50, a corresponding CBP Packet Identifier (CPID) is provided to the appropriate egress manager 76; this CPID points to the memory location of initial cell 112*a*. The CPID for the data packet is then used when the data packet 112 is sent to the destination egress port 24*c*. In actuality, the CBM 71 maintains two buffers containing a CBP cell pointer, with admission to the CBP being based upon a number of factors. An example of admission logic for CBP 50 will be discussed below with reference to FIG. 12.

Since CBM 71 controls data flow within SOC 10, the data flow associated with any ingress port can likewise be controlled. When packet 112 has been received and stored in CBP 50, a CPID is provided to the associated egress manager 76. The total number of data cells associated with the data packet is stored in a budget register (not shown). As more data packets 112 are received and designated to be sent to the same egress manager 76, the value of the budget register corresponding to the associated egress manager 76 is incremented by the number of data cells 112$a$, 112$b$ of the new data cells received. The budget register therefore dynamically represents the total number of cells designated to be sent by any specific egress port on an EPIC 20. CBM 71 controls the inflow of additional data packets by comparing the budget register to a high watermark register value or a low watermark register value, for the same egress.

When the value of the budget register exceeds the high watermark value, the associated ingress port is disabled. Similarly, when data cells of an egress manager 76, are sent via the egress port, and the corresponding budget register decreases to a value below the low watermark value, the ingress port is once again enabled. When egress manager 76 initiates the transmission of packet 112, egress manager 76 notifies CBM 71, which then decrements the budget register value by the number of data cells which are transmitted. The specific high watermark values and low watermark values can be programmed by the user via CPU 52. This gives the user control over the data flow of any port on any EPIC 20 or GPIC 30.

Egress manager 76 is also capable of controlling data flow. Each egress manager 76 is provided with the capability to keep track of packet identification information in a packet pointer budget register; as a new pointer is received by egress manager 76, the associated packet pointer budget register is incremented. As egress manager 76 sends out a data packet 112, the packet pointer budget register is decremented. When a storage limit assigned to the register is reached, corresponding to a full packet identification pool, a notification message is sent to all ingress ports of the SOC 10, indicating that the destination egress port controlled by that egress manager 76 is unavailable. When the packet pointer budget register is decremented below the packet pool high watermark value, a notification message is sent that the destination egress port is now available. The notification messages are sent by CBM 71 on the S channel 83.

As noted previously, flow control may be provided by CBM 71, and also by ingress submodule 14 of either an EPIC 20 or GPIC 30. Ingress submodule 14 monitors cell transmission into ingress port 24. When a data packet 112 is received at an ingress port 24, the ingress submodule 14 increments a received budget register by the cell count of the incoming data packet. When a data packet 112 is sent, the corresponding ingress 14 decrements the received budget register by the cell count of the outgoing data packet 112. The budget register 72 is decremented by ingress 14 in response to a decrement cell count message initiated by CBM 71, when a data packet 112 is successfully transmitted from CBP 50.

Efficient handling of the CBP and GBP is necessary in order to maximize throughput, to prevent port starvation, and to prevent port underrun. For every ingress, there is a low watermark and a high watermark; if cell count is below the low watermark, the packet is admitted to the CBP, thereby preventing port starvation by giving the port an appropriate share of CBP space.

Figure 12:
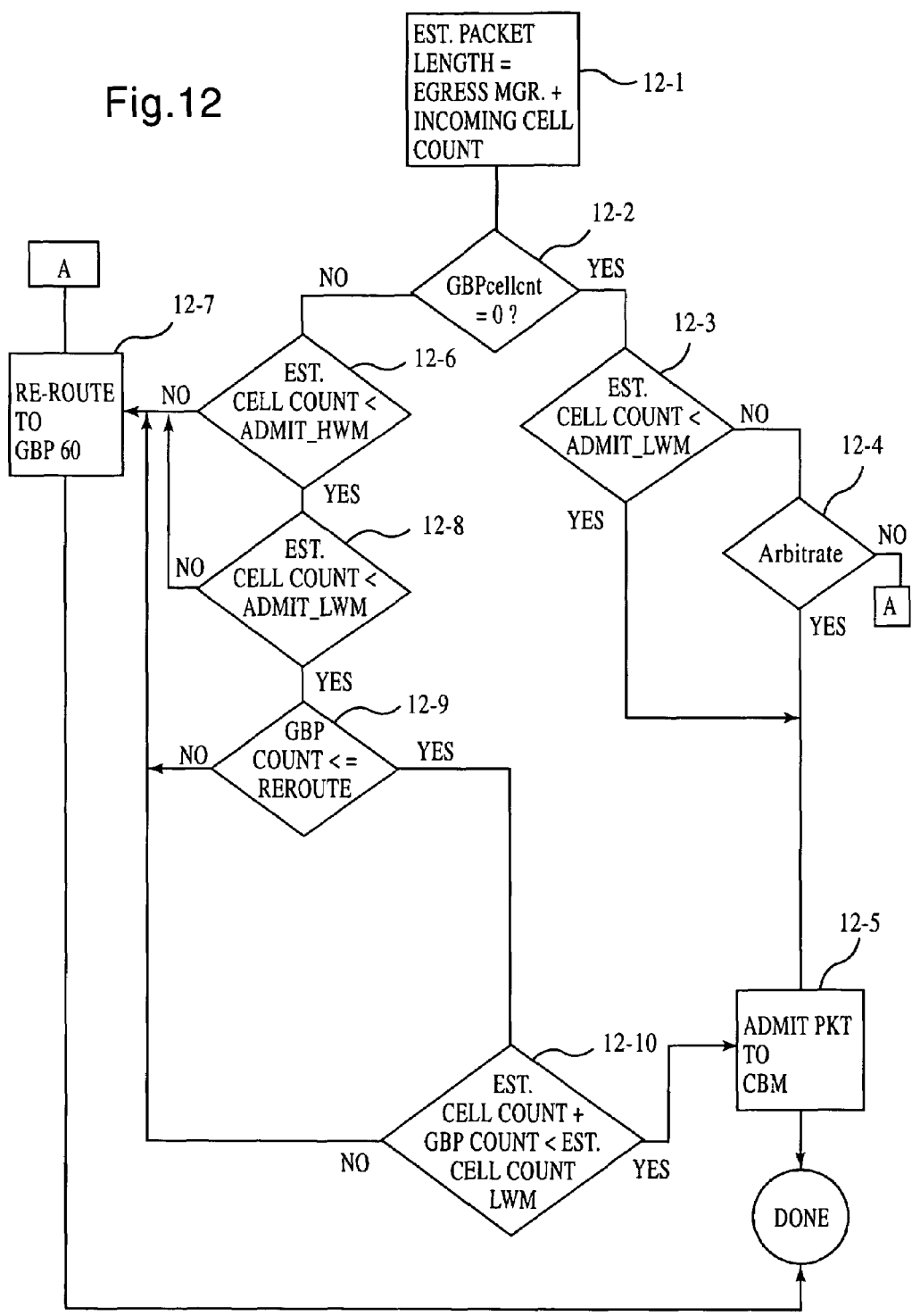
FIG. 12 illustrates an internal/external memory admission flow chart.

FIG. 12 generally illustrates the handling of a data packet 112 when it is received at an appropriate ingress port. This figure illustrates dynamic memory allocation on a single port, and is applicable for each ingress port. In step 12-1, packet length is estimated by estimating cell count based upon egress manager count plus incoming cell count. After this cell count is estimated, the GBP current cell count is checked at step 12-2 to determine whether or not the GBP 60 is empty. If the GBP cell count is 0, indicating that GBP 60 is empty, the method proceeds to step 12-3, where it is determined whether or not the estimated cell count from step 12-1 is less than the admission low watermark. The admission low watermark value enables the reception of new packets 112 into CBP 50 if the total number of cells in the associated egress is below the admission low watermark value. If yes, therefore, the packet is admitted at step 12-5. If the estimated cell count is not below the admission low watermark, CBM 71 then arbitrates for CBP memory allocation with other ingress ports of other EPICs and GPICs, in step 12-4. If the arbitration is unsuccessful, the incoming packet is sent to a reroute process, referred to as A. If the arbitration is successful, then the packet is admitted to the CBP at step 12-5. Admission to the CBP is necessary for linespeed communication to occur.

The above discussion is directed to a situation wherein the GBP cell count is determined to be 0. If in step 12-2 the GBP cell count is determined not to be 0, then the method proceeds to step 12-6, where the estimated cell count determined in step 12-1 is compared to the admission high watermark. If the answer is no, the packet is rerouted to GBP 60 at step 12-7. If the answer is yes, the estimated cell count is then compared to the admission low watermark at step 12-8. If the answer is no, which means that the estimated cell count is between the high watermark and the low watermark, then the packet is rerouted to GBP 60 at step 12-7. If the estimated cell count is below the admission low watermark, the GBP current count is compared with a reroute cell limit value at step 12-9. This reroute cell limit value is user programmable through CPU 52. If the GBP count is below or equal to the reroute cell limit value at step 12-9, the estimated cell count and GBP count are compared with an estimated cell count low watermark; if the combination of estimated cell count and GBP count are less than the estimated cell count low watermark, the packet is admitted to the CBP. If the sum is greater than the estimated cell count low watermark, then the packet is rerouted to GBP 60 at step 12-7. After rerouting to GBP 60, the GBP cell count is updated, and the packet processing is finished. It should be noted that if both the CBP and the GBP are full, the packet is dropped. Dropped packets are handled in accordance with known Ethernet or network communication procedures, and have the effect of delaying communication. However, this configuration applies appropriate back pressure by setting watermarks, through CPU 52, to appropriate buffer values on a per port basis to maximize memory utilization. This CBP/GBP admission logic results in a distributed hierarchical shared memory configuration, with a hierarchy between CBP 50 and GBP 60, and hierarchies within the CBP.

Address Resolution (L2)+(L3)

Figure 14:
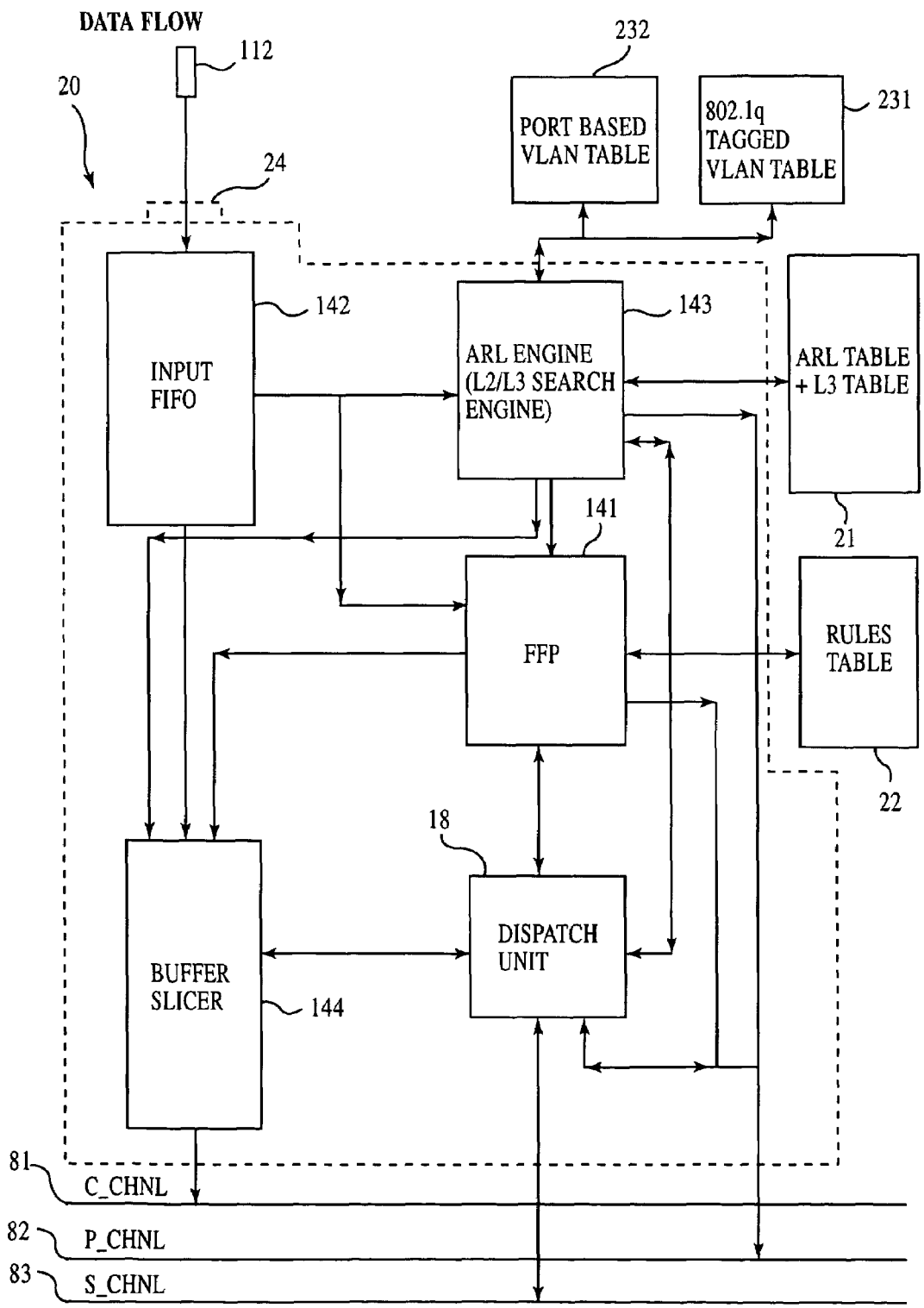
FIG. 14 illustrates more details of an EPIC module.

FIG. 14 illustrates some of the concurrent filtering and look-up details of a packet coming into the ingress side of an EPIC 20. FIG. 12, as discussed previously, illustrates the handling of a data packet with respect to admission into the distributed hierarchical shared memory. FIG. 14 addresses the application of filtering, address resolution, and rules application segments of SOC 10. These functions are performed simultaneously with respect to the CBP admission discussed above. As shown in the figure, packet 112 is received at input port 24 of EPIC 20. It is then directed to input FIFO 142. As soon as the first sixteen bytes of the packet arrive in the input FIFO 142, an address resolution request is sent to ARL engine 143; this initiates lookup in ARL/L3 tables 21.

A description of the fields of an ARL table of ARL/L3 tables 21 is as follows:

Mac Address—48 bits long—Mac Address;

VLAN tag—12 bits long—VLAN Tag Identifier as described in IEEE 802.1q standard for tagged packets. For an untagged Packet, this value is picked up from Port Based VLAN Table.

CosDst—3 bits long—Class of Service based on the Destination Address. COS identifies the priority of this packet. 8 levels of priorities as described in IEEE 802.1p standard.

Port Number—6 bits long—Port Number is the port on which this Mac address is learned.

SD_Disc Bits —2 bits long—These bits identifies whether the packet should be discarded based on Source Address or Destination Address. Value 1 means discard on source. Value 2 means discard on destination.

C bit—1 bit long—C Bit identifies that the packet should be given to CPU Port.

St Bit—1 bit long—St Bit identifies that this is a static entry (it is not learned Dynamically) and that means is should not be aged out. Only CPU 52 can delete this entry.

Ht Bit—1 bit long—Hit Bit—This bit is set if there is match with the Source Address. It is used in the aging Mechanism.

CosSrc—3 bits long—Class of Service based on the Source Address.

COS identifies the priority of this packet.

L3 Bit—1 bit long—L3 Bit—identifies that this entry is created as result of L3 Interface Configuration. The Mac address in this entry is L3 interface Mac Address and that any Packet addresses to this Mac Address need to be routed.

T Bit—1 bit long—T Bit identifies that this Mac address is learned from one of the Trunk Ports. If there is a match on Destination address then output port is not decided on the Port Number in this entry, but is decided by the Trunk Identification Process based on the rules identified by the RTAG bits and the Trunk group Identified by the TGID.

TGID—3 bits long—TGID identifies the Trunk Group if the T Bit is set. SOC 10 supports 6 Trunk Groups per switch.

RTAG—3 bits long—RTAG identifies the Trunk selection criterion if the destination address matches this entry and the T bit is set in that entry. Value 1—based on Source Mac Address. Value 2—based on Destination Mac Address. Value 3—based on Source & destination Address. Value 4—based on Source IP Address. Value 5—based on Destination IP Address. Value 6—based on Source and Destination IP Address.

S C P—1 bit long—Source CoS Priority Bit—If this bit is set (in the matched Source Mac Entry) then Source CoS has priority over Destination Cos.

It should also be noted that VLAN tables 23 include a number of table formats; all of the tables and table formats will not be discussed here. However, as an example, the port based VLAN table fields are described as follows:

Port VLAN Id—12 bits long—Port VLAN Identifier is the VLAN Id used by Port Based VLAN.

Sp State—2 bits long—This field identifies the current Spanning Tree State. Value 0×00—Port is in Disable State. No packets are accepted in this state, not even BPDUs. Value 0×01—Port is in Blocking or Listening State. In this state no packets are accepted by the port, except BPDUs. Value 0×02—Port is in Learning State. In this state the packets are not forwarded to another Port but are accepted for learning. Value 0×03—Port is in Forwarding State. In this state the packets are accepted both for learning and forwarding.

Port Discard Bits—6 bits long—There are 6 bits in this field and each bit identifies the criterion to discard the packets coming in this port. Note: Bits 0 to 3 are not used. Bit 4—If this bit is set then all the frames coming on this port will be discarded. Bit 5—If this bit is set then any 802.1q Priority Tagged (vid=0) and Untagged frame coming on this port will be discarded.

J Bit—1 bit long—J Bit means Jumbo bit. If this bit is set then this port should accept Jumbo Frames.

RTAG—3 bits long—RTAG identifies the Trunk selection criterion if the destination address matches this entry and the T bit is set in that entry. Value 1—based on Source Mac Address. Value 2—based on Destination Mac Address. Value 3—based on Source & destination Address. Value 4—based on Source IP Address. Value 5—based on Destination IP Address. Value 6—based on Source and Destination IP Address.

T Bit—1 bit long—This bit identifies that the Port is a member of the Trunk Group.

C Learn Bit—1 bit long—Cpu Learn Bit—If this bit is set then the packet is send to the CPU whenever the source Address is learned.

PT—2 bits long—Port Type identifies the port Type. Value 0–10 Mbit Port. Value 1–100 Mbit Port. Value 2—1 Gbit Port. Value 3-CPU Port.

VLAN Port Bitmap—28 bits long—VLAN Port Bitmap Identifies all the egress ports on which the packet should go out.

B Bit—1 bit long—B bit is BPDU bit. If this bit is set then the Port rejects BPDUs. This Bit is set for Trunk Ports which are not supposed to accept BPDUs.

TGID—3 bits long—TGID—this field identifies the Trunk Group which this port belongs to.

Untagged Bitmap—28 bits long—This bitmap identifies the Untagged Members of the VLAN. i.e. if the frame destined out of these members ports should be transmitted without Tag Header.

M Bits—1 bit long—M Bit is used for Mirroring Functionality. If this bit is set then mirroring on Ingress is enabled.

The ARL engine 143 reads the packet; if the packet has a VLAN tag according to IEEE Standard 802.1q, then ARL engine 143 performs a look-up based upon tagged VLAN table 231, which is part of VLAN table 23. If the packet does not contain this tag, then the ARL engine performs VLAN lookup based upon the port based VLAN table 232. Once the VLAN is identified for the incoming packet, ARL engine 143 performs an ARL table search based upon the source MAC address and the destination MAC address. If the results of the destination search is an L3 interface MAC address, then an L3 search is performed of an L3 table within ARL/L3 table 21. If the L3 search is successful, then the packet is modified according to packet routing rules. To better understand lookups, learning, and switching, it may be advisable to once again discuss the handling of packet 112 with respect to FIG. 8. If data packet 112 is sent from a source station A into port 24a of EPIC 20a, and destined for a destination station B on port 24c of EPIC 20c, ingress submodule 14a slices data packet 112 into cells 112a and 112b. The ingress submodule then reads the packet to determine the source MAC address and the destination MAC address. As discussed previously, ingress submodule 14a, in particular ARL engine 143, performs the lookup of appropriate tables within ARL/L3 tables 21a, and VLAN table 23a, to see if the destination MAC address exists in ARL/L3 tables 21a; if the address is not found, but if the VLAN IDs are the same for the source and destination, then ingress submodule 14a will set the packet to be sent to all ports. The packet will then propagate to the appropriate destination address. A "source search" and a "destination search" occurs in parallel. Concurrently, the source MAC address of the incoming packet is "learned", and therefore added to an ARL table within ARL/L3 table 21a. After the packet is received by the destination, an acknowledgement is sent by destination station B to source station A. Since the source MAC address of the incoming packet is learned by the appropriate table of B, the acknowledgement is appropriately sent to the port on which A is located. When the acknowledgement is received at port 24a, therefore, the ARL table learns the source MAC address of B from the acknowledgement packet. It should be noted that as long as the VLAN IDs (for tagged packets) of source MAC addresses and destination MAC addresses are the same, layer two switching as discussed above is performed. L2 switching and lookup is therefore based on the first 16 bytes of an incoming packet. For untagged packets, the port number field in the packet is indexed to the port-based VLAN table within VLAN table 23a, and the VLAN ID can then be determined. If the VLAN IDs are different, however, L3 switching is necessary wherein the packets are sent to a different VLAN. L3 switching, however, is based on the IP header field of the packet. The IP header includes source IP address, destination IP address, and TTL (time-to-live).

In order to more clearly understand layer three switching according to the invention, data packet 112 is sent from source station A onto port 24a of EPIC 20a, and is directed to destination station B; assume, however, that station B is disposed on a different VLAN, as evidenced by the source MAC address and the destination MAC address having differing VLAN IDs. The lookup for B would be unsuccessful since B is located on a different VLAN, and merely sending the packet to all ports on the VLAN would result in B never receiving the packet. Layer three switching, therefore, enables the bridging of VLAN boundaries, but requires reading of more packet information than just the MAC addresses of L2 switching. In addition to reading the source and destination MAC addresses, therefore, ingress 14a also reads the IP address of the source and destination. As noted previously, packet types are defined by IEEE and other standards, and are known in the art. By reading the IP address of the destination, SOC 10 is able to target the packet to an appropriate router interface which is consistent with the destination IP address. Packet 112 is therefore sent on to CPS channel 80 through dispatch unit 18a, destined for an appropriate router interface (not shown, and not part of SOC 10), upon which destination B is located. Control frames, identified as such by their destination address, are sent to CPU 52 via CMIC 40. The destination MAC address, therefore, is the router MAC address for B. The router MAC address is learned through the assistance of CPU 52, which uses an ARP (address resolution protocol) request to request the destination MAC address for the router for B, based upon the IP address of B. Through the use of the IP address, therefore, SOC 10 can learn the MAC address. Through the acknowledgement and learning process, however, it is only the first packet that is subject to this "slow" handling because of the involvement of CPU 52. After the appropriate MAC addresses are learned, linespeed switching can occur through the use of concurrent table lookups since the necessary information will be learned by the tables. Implementing the tables in silicon as two-dimensional arrays enables such rapid concurrent lookups. Once the MAC address for B has been learned, therefore, when packets come in with the IP address for B, ingress 14a changes the IP address to the destination MAC address, in order to enable linespeed switching. Also, the source address of the incoming packet is changed to the router MAC address for A rather than the IP address for A, so that the acknowledgement from B to A can be handled in a fast manner without needing to utilize a CPU on the destination end in order to identify the source MAC address to be the destination for the acknowledgement. Additionally, a TTL (time-to-live) field in the packet is appropriately manipulated in accordance with the IETF (Internet Engineering Task Force) standard. A unique aspect of SOC 10 is that all of the switching, packet processing, and table lookups are performed in hardware, rather than requiring CPU 52 or another CPU to spend time processing instructions. It should be noted that the layer three tables for EPIC 20 can have varying sizes; in the exemplary switch configuration, these tables are capable of holding up to 2000 addresses, and are subject to purging and deletion of aged addresses, as explained herein.

Referring again to the discussion of FIG. 14, as soon as the first 64 (sixty four) bytes of the packet arrive in input FIFO 142, a filtering request is sent to FFP 141. FFP 141 is an extensive filtering mechanism which enables SOC 10 to set inclusive and exclusive filters on any field of a packet from layer 2 to layer 7 of the OSI seven layer model. Filters are used for packet classification based upon protocol fields in the packets, and with respect to VOIP configurations discussed below, the filters are uses to trap and prioritize VOIP packets in order to reduce latency. Various actions are taken based upon the packet classification, including packet discard, sending of the packet to the CPU, sending of the packet to other ports, sending the packet on certain COS priority queues, changing the type of service (TOS) precedence. The exclusive filter is primarily used for implementing security features, and allows a packet to proceed only if there is a filter match. If there is no match, the packet is discarded.

It should be noted that the exemplary SOC 10 has a unique capability to handle both tagged and untagged packets coming in. Tagged packets are tagged in accordance with IEEE standards, and include a specific IEEE 802.1p priority field for the packet. Untagged packets, however, do not include an 802.1p priority field therein. SOC 10 can assign an appropriate COS value for the packet, which can be considered to be equivalent to a weighted priority, based either upon the destination address or the source address of the packet, as matched in one of the table lookups. As noted in the ARL table format discussed herein, an SCP (Source COS Priority) bit is contained as one of the fields of the table. When this SCP bit is set, then SOC 10 will assign weighted priority based upon a source COS value in the ARL table. If the SCP is not set, then SOC 10 will assign a COS for the packet based upon the destination COS field in the ARL table. These COS of values are three bit fields in the ARL table, as noted previously in the ARL table field descriptions.

FFP 141 is essentially a state machine driven programmable rules engine. The filters used by the FFP are 64 (sixty-four) bytes wide, and are applied on an incoming packet; any offset can be used, however, the exemplary switch configuration uses an offset of zero, and therefore operates on the first 64 bytes, or 512 bits, of a packet. The actions taken by the filter are tag insertion, priority mapping, TOS tag insertion, sending of the packet to the CPU, dropping of the packet, forwarding of the packet to an egress port, and sending the packet to a mirrored port. The filters utilized by FFP 141 are defined by rules table 22. Rules table 22 is completely programmable by CPU 52, through CMIC 40. The rules table can be, for example, 256 entries deep, and may be partitioned for inclusive and exclusive filters, with, again as an example, 128 entries for inclusive filters and 128 entries for exclusive filters. A filter database, within FFP 141, includes a number of inclusive mask registers and exclusive mask registers, such that the filters are formed based upon the rules in rules table 22, and the filters therefore essentially form a 64 byte wide mask or bit map which is applied on the incoming packet. If the filter is designated as an exclusive filter, the filter will exclude all packets unless there is a match. In other words, the exclusive filter allows a packet to go through the forwarding process only if there is a filter match. If there is no filter match, the packet is dropped. In an inclusive filter, if there is no match, no action is taken but the packet is not dropped. Action on an exclusive filter requires an exact match of all filter fields. If there is an exact match with an exclusive filter, therefore, action is taken as specified in the action field; the actions which may be taken, are discussed above. If there is no full match or exact of all of the filter fields, but there is a partial match, then the packet is dropped. A partial match is defined as either a match on the ingress field, egress field, or filter select fields. If there is neither a full match nor a partial match with the packet and the exclusive filter, then no action is taken and the packet proceeds through the forwarding process. The FFP configuration, taking action based upon the first 64 bytes of a packet, enhances the handling of real time traffic since packets can be filtered and action can be taken on the fly. Without an FFP according to the invention, the packet would need to be transferred to the CPU for appropriate action to be interpreted and taken. For inclusive filters, if there is a filter match, action is taken, and if there is no filter match, no action is taken; however, packets are not dropped based on a match or no match situation for inclusive filters.

In summary, the FFP includes a filter database with eight sets of inclusive filters and eight sets of exclusive filters, as separate filter masks. As a packet comes into the FFP, the filter masks are applied to the packet; in other words, a logical AND operation is performed with the mask and the packet. If there is a match, the matching entries are applied to rules tables 22, in order to determine which specific actions will be taken. As mentioned previously, the actions include 802.1p tag insertion, 802.1p priority mapping, IP TOS (type-of-service) tag insertion, sending of the packet to the CPU, discarding or dropping of the packet, forwarding the packet to an egress port, and sending the packet to the mirrored port. Since there are a limited number of fields in the rules table, and since particular rules must be applied for various types of packets, the rules table requirements are minimized in the present exemplary network switch by the switch setting all incoming packets to be "tagged" packets; all untagged packets, therefore, are subject to 802.1 p tag insertion, in order to reduce the number of entries which are necessary in the rules table. This action eliminates the need for entries regarding handling of untagged packets. It should be noted that specific packet types are defined by various IEEE and other networking standards, and will not be defined herein.

Figure 15:
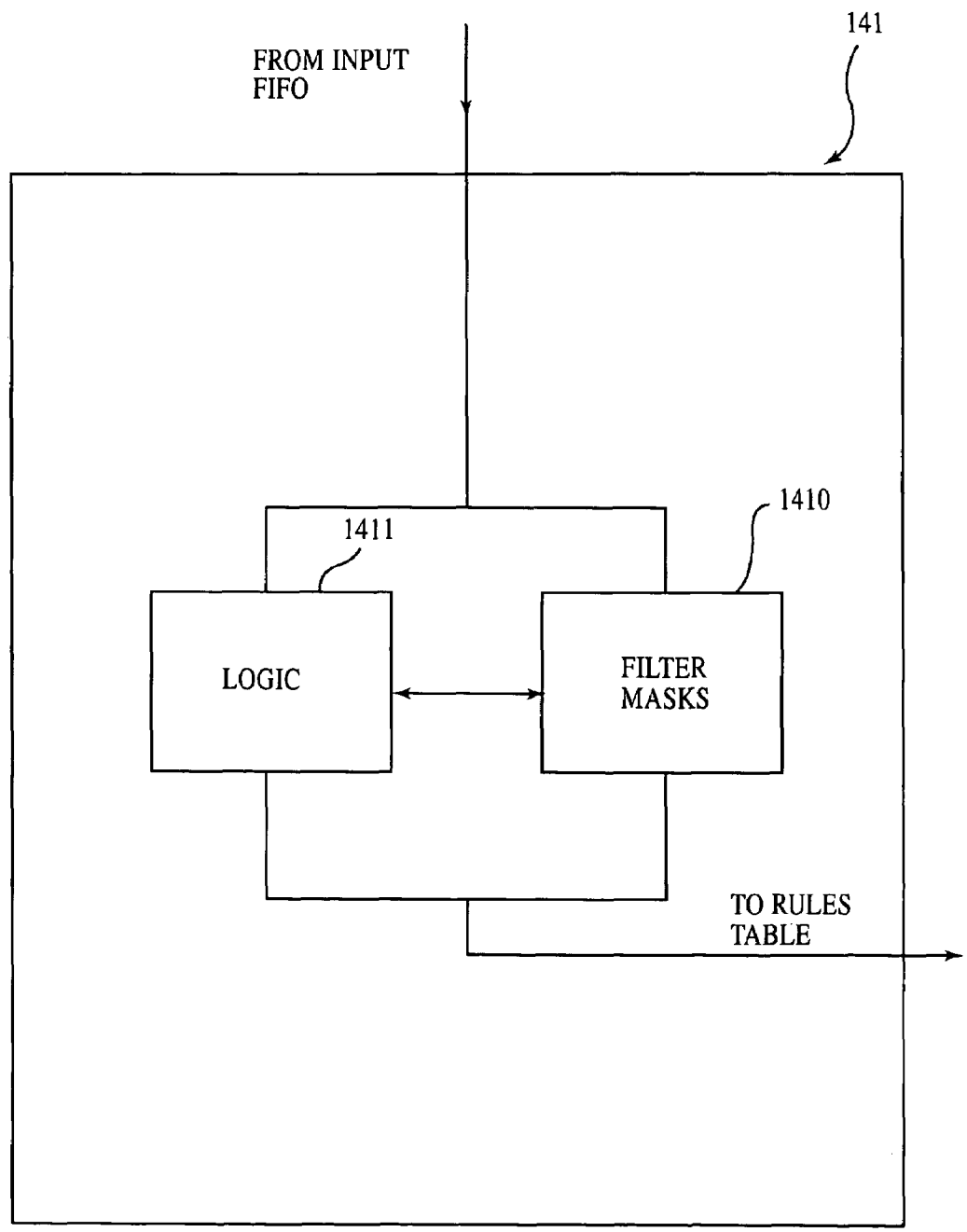
FIG. 15 is a block diagram of a fast filtering processor (FFP)

As noted previously, exclusive filters are defined in the rules table as filters which exclude packets for which there is no match; excluded packets are dropped. With inclusive filters, however, packets are not dropped in any circumstances. If there is a match, action is taken as discussed above; if there is no match, no action is taken and the packet proceeds through the forwarding process. Referring to FIG. 15, FFP 141 is shown to include filter database 1410 containing filter masks therein, communicating with logic circuitry 1411 for determining packet types and applying appropriate filter masks. After the filter mask is applied as noted above, the result of the application is applied to rules table 22, for appropriate lookup and action. It should be noted that the filter masks, rules tables, and logic, while programmable by CPU 52, do not rely upon CPU 52 for the processing and calculation thereof. After programming, a hardware configuration is provided which enables linespeed filter application and lookup.

Referring once again to FIG. 14, after FFP 141 applies appropriate configured filters and results are obtained from the appropriate rules table 22, logic in FFP 141 determines and takes the appropriate action. The filtering logic can discard the packet, send the packet to the CPU 52, modify the packet header or IP header, and recalculate any IP checksum fields or takes other appropriate action with respect to the headers. The modification occurs at buffer slicer 144, and the packet is placed on C channel 81. The control message and message header information is applied by the FFP 141 and ARL engine 143, and the message header is placed on P channel 82. Dispatch unit 18, also generally discussed with respect to FIG. 8, coordinates all dispatches to C channel, P channel and S channel. As noted previously, each EPIC module 20, GPIC module 30, PMMU 70, etc. are individually configured to communicate via the CPS channel. Each module can be independently modified, and as long as the CPS channel interfaces are maintained, internal modifications to any modules such as EPIC 20*a* should not affect any other modules such as EPIC 20*b*, or any GPICs 30.

Figure 17:
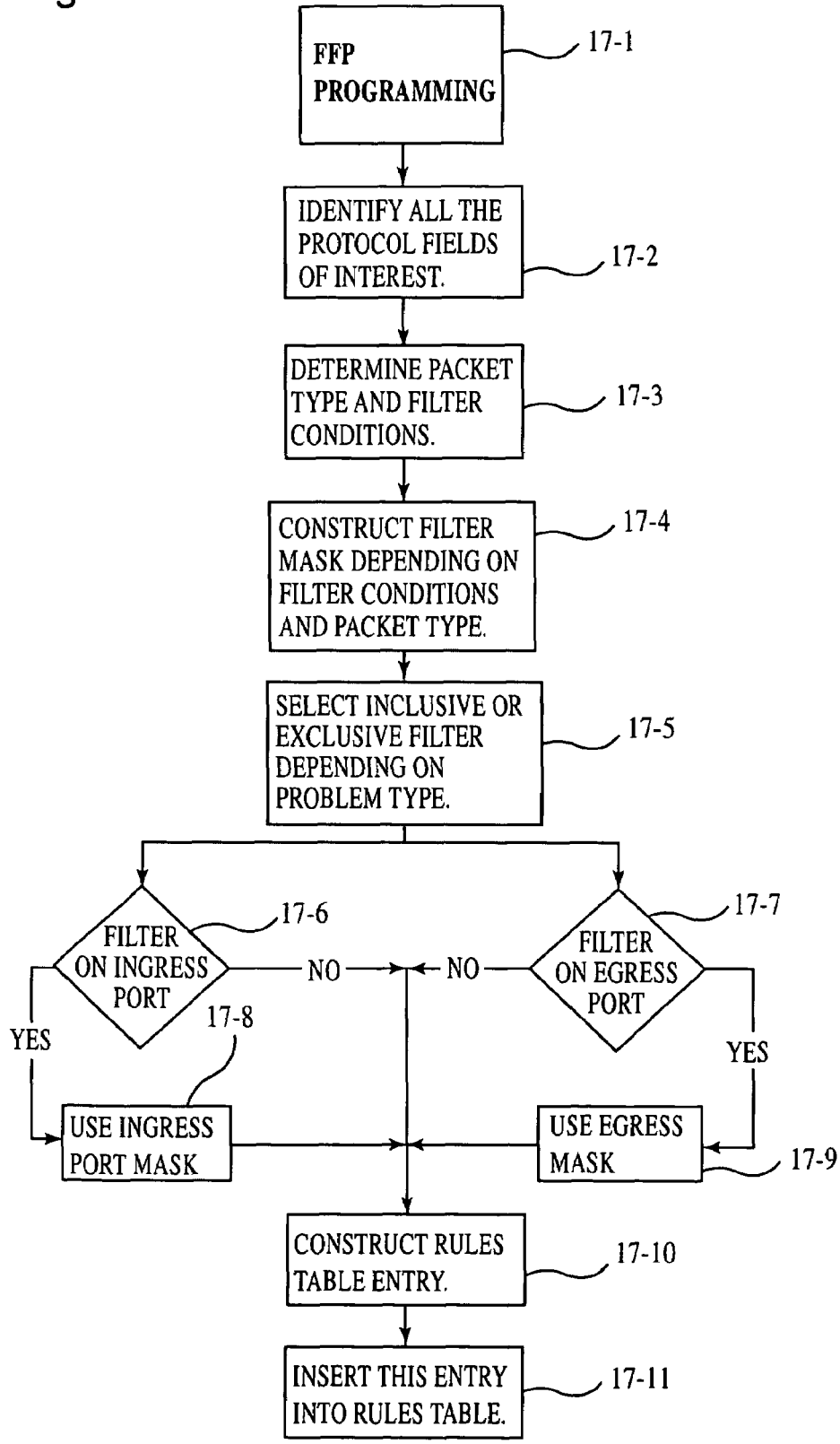
FIG. 17 illustrates a series of steps which are used to program an FFP.

As mentioned previously, FFP 141 is programmed by the user, through CPU 52, based upon the specific functions which are sought to be handled by each FFP 141. Referring to FIG. 17, it can be seen that in step 17-1, an FFP programming step is initiated by the user, or alternatively, this step can be initiated by preprogrammed software without direct user involvement. Once programming has been initiated, the user identifies the protocol fields of the packet which are to be of interest for the filter, in step 17-2. In step 17-3, the packet type and filter conditions are determined, and in step 17-4, a filter mask is constructed based upon the identified packet type, and the desired filter conditions. The filter mask is essentially a bit map which is applied or ANDed with selected fields of the packet. After the filter mask is constructed, it is then determined whether the filter will be an inclusive or exclusive filter, depending upon the problems which are sought to be solved, the packets which are sought to be forwarded, actions sought to be taken, etc. In step 17-6, it is determined whether or not the filter is on the ingress port, and in step 17-7, it is determined whether or not the filter is on the egress port. If the filter is on the ingress port, an ingress port mask is used in step 17-8. If it is determined that the filter will be on the egress port, then an egress mask is used in step 17-9. Based upon these steps, a rules table entry for rules tables 22 is then constructed, and the entry or entries are placed into the appropriate rules table (steps 17-10 and 17-11). These steps are taken through the user inputting particular sets of rules and information into CPU 52 by an appropriate input device, and CPU 52 taking the appropriate action with respect to creating the filters, through CMIC 40 and the appropriate ingress or egress submodules on an appropriate EPIC module 20 or GPIC module 30.

It should also be noted that the block diagram of SOC 10 in FIG. 2 illustrates each GPIC 30 having its own ARL/L3 tables 31, rules table 32, and VLAN tables 33, and also each EPIC 20 also having its own ARL/L3 tables 21, rules table 22, and VLAN tables 23. In the exemplary switch configuration, however, two separate modules can share a common ARL/L3 table and a common VLAN table. Each module, however, has its own rules table 22. For example, therefore, GPIC 30a may share ARL/L3 table 21a and VLAN table 23a with EPIC 20a. Similarly, GPIC 30b may share ARL table 21b and VLAN table 23b with EPIC 20b. This sharing of tables reduces the number of gates which are required to implement the invention, and makes for simplified lookup and synchronization as will be discussed below.

Table Synchronization and Aging

SOC 10 utilizes a unique method of table synchronization and aging, to ensure that only current and active address information is maintained in the tables. When ARL/L3 tables are updated to include a new source address, a "hit bit" is set within the table of the "owner" or obtaining module to indicate that the address has been accessed. Also, when a new address is learned and placed in the ARL table, an S channel message is placed on S channel 83 as an ARL insert message, instructing all ARL/L3 tables on SOC 10 to learn this new address. The entry in the ARL/L3 tables includes an identification of the port which initially received the packet and learned the address. Therefore, if EPIC 20a contains the port which initially received the packet and therefore which initially learned the address, EPIC 20a becomes the "owner" of the address. Only EPIC 20a, therefore, can delete this address from the table. The ARL insert message is received by all of the modules, and the address is added into all of the ARL/L3 tables on SOC 10. CMIC 40 will also send the address information to CPU 52. When each module receives and learns the address information, an acknowledge or ACK message is sent back to EPIC 20a; as the owner further ARL insert messages cannot be sent from EPIC 20a until all ACK messages have been received from all of the modules. In the exemplary switch configuration, CMIC 40 does not send an ACK message, since CMIC 40 does not include ingress/egress modules thereupon, but only communicates with CPU 52. If multiple SOC 10 are provided in a stacked configuration, all ARL/L3 tables would be synchronized due to the fact that CPS channel 80 would be shared throughout the stacked modules.

Figure 18:
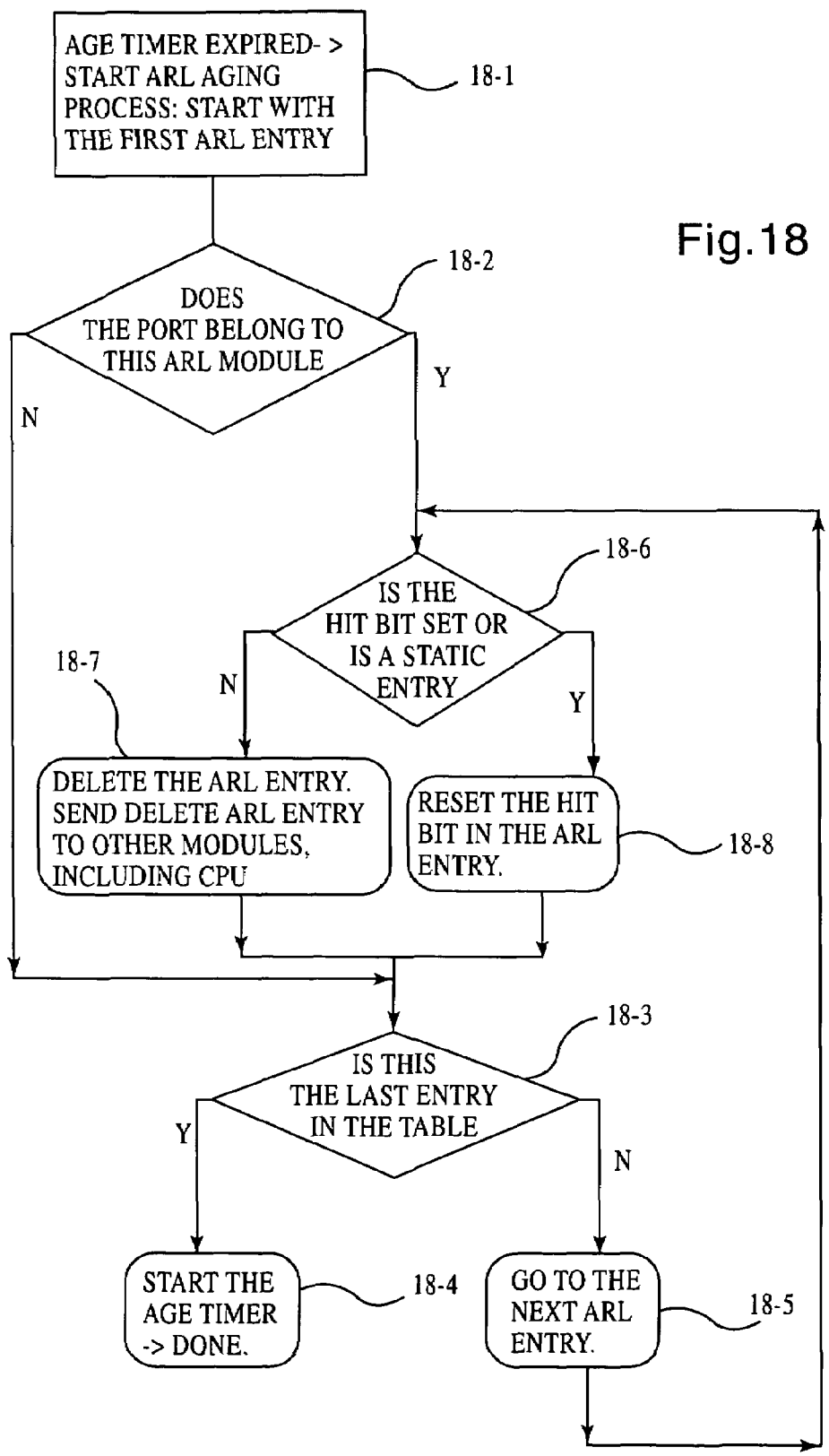
FIG. 18 is a flow chart illustrating the aging process for ARL (L2) and L3 tables.

Referring to FIG. 18, the ARL aging process is discussed. An age timer is provided within each EPIC module 20 and GPIC module 30, at step 18-1, it is determined whether the age timer has expired. If the timer has expired, the aging process begins by examining the first entry in ARL table 21. At step 18-2, it is determined whether or not the port referred to in the ARL entry belongs to the particular module. If the answer is no, the process proceeds to step 18-3, where it is determined whether or not this entry is the last entry in the table. If the answer is yes at step 18-3, the age timer is restarted and the process is completed at step 18-4. If this is not the last entry in the table, then the process is returned to the next ARL entry at step 18-5. If, however, at step 18-2 it is determined that the port does belong to this particular module, then, at step 18-6 it is determined whether or not the hit bit is set, or if this is a static entry. If the hit bit is set, the hit bit is reset at step 18-7, and the method then proceeds to step 18-3. If the hit bit is not set, the ARL entry is deleted at step 18-8, and a delete ARL entry message is sent on the CPS channel to the other modules, including CMIC 40, so that the table can be appropriately synchronized as noted above. This aging process can be performed on the ARL (layer two) entries, as well as layer three entries, in order to ensure that aged packets are appropriately deleted from the tables by the owners of the entries. As noted previously, the aging process is only performed on entries where the port referred to belongs to the particular module which is performing the aging process. To this end, therefore, the hit bit is only set in the owner module. The hit bit is not set for entries in tables of other modules which receive the ARL insert message. The hit bit is therefore always set to zero in the synchronized non-owner tables.

The purpose of the source and destination searches, and the overall lookups, is to identify the port number within SOC 10 to which the packet should be directed to after it is placed either CBP 50 or GBP 60. Of course, a source lookup failure results in learning of the source from the source MAC address information in the packet; a destination lookup failure, however, since no port would be identified, results in the packet being sent to all ports on SOC 10. As long as the destination VLAN ID is the same as the source VLAN ID, the packet will propagate the VLAN and reach the ultimate destination, at which point an acknowledgement packet will be received, thereby enabling the ARL table to learn the destination port for use on subsequent packets. If the VLAN IDs are different, an L3 lookup and learning process will be performed, as discussed previously. It should be noted that each EPIC and each GPIC contains a FIFO queue to store ARL insert messages, since, although each module can only send one message at a time, if each module sends an insert message, a queue must be provided for appropriate handling of the messages.

Port Movement

After the ARL/L3 tables have entries in them, the situation sometimes arises where a particular user or station may change location from one port to another port. In order to prevent transmission errors, therefore, SOC 10 includes capabilities of identifying such movement, and updating the table entries appropriately. For example, if station A, located for example on port 1, seeks to communicate with station B, whose entries indicate that user B is located on port 26. If station B is then moved to a different port, for example, port 15, a destination lookup failure will occur and the packet will be sent to all ports. When the packet is received by station B at port 15, station B will send an acknowledge (ACK) message, which will be received by the ingress of the EPIC/GPIC module containing port 1 thereupon. A source lookup (of the acknowledge message) will yield a match on the source address, but the port information will not match. The EPIC/GPIC which receives the packet from B, therefore, must delete the old entry from the ARL/L3 table, and also send an ARL/L3 delete message onto the S channel so that all tables are synchronized. Then, the new source information, with the correct port, is inserted into the ARL/L3 table, and an ARL/L3 insert message is placed on the S channel, thereby synchronizing the ARL/L3 tables with the new information. The updated ARL insert message cannot be sent until all of the acknowledgement messages are sent regarding the ARL delete message, to ensure proper table synchronization. As stated previously, typical ARL insertion and deletion commands can only be initiated by the owner module. In the case of port movement, however, since port movement may be identified by any module sending a packet to a moved port, the port movement-related deletion and insertion messages can be initiated by any module.

Trunking

Figure 19:
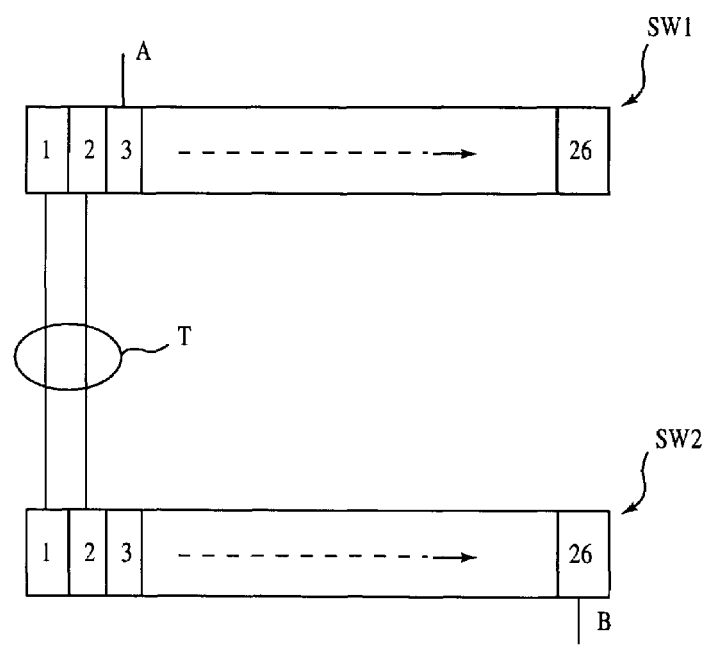
FIG. 19 illustrates communication using a trunk.

During the configuration process wherein a local area network is configured by an administrator with a plurality of switches, etc., numerous ports can be "trunked" to increase bandwidth. For example, if traffic between a first switch SW1 and a second switch SW2 is anticipated as being high, the LAN can be configured such that a plurality of ports, for example ports 1 and 2, can be connected together. In a 100 megabits per second environment, the trunking of two ports effectively provides an increased bandwidth of 200 megabits per second between the two ports. The two ports 1 and 2, are therefore identified as a trunk group, and CPU 52 is used to properly configure the handling of the trunk group. Once a trunk group is identified, it is treated as a plurality of ports acting as one logical port. FIG. 19 illustrates a configuration wherein SW1, containing a plurality of ports thereon, has a trunk group with ports 1 and 2 of SW2, with the trunk group being two communication lines connecting ports 1 and 2 of each of SW1 and SW2. This forms trunk group T. In this example, station A, connected to port 3 of SW1, is seeking to communicate or send a packet to station B, located on port 26 of switch SW2. The packet must travel, therefore, through trunk group T from port 3 of SW1 to port 26 of SW2. It should be noted that the trunk group could include any of a number of ports between the switches. As traffic flow increases between SW1 and SW2, trunk group T could be reconfigured by the administrator to include more ports, thereby effectively increasing bandwidth. In addition to providing increased bandwidth, trunking provides redundancy in the event of a failure of one of the links between the switches. Once the trunk group is created, a user programs SOC 10 through CPU 52 to recognize the appropriate trunk group or trunk groups, with trunk group identification (TGID) information. A trunk group port bit map is prepared for each TGID; and a trunk group table, provided for each module on SOC 10, is used to implement the trunk group, which can also be called a port bundle. A trunk group bit map table is also provided. These two tables are provided on a per module basis, and, like tables 21, 22, and 23, are implemented in silicon as two-dimensional arrays. In one configuration of SOC 10, six trunk groups can be supported, with each trunk group having up to eight trunk ports thereupon. For communication, however, in order to prevent out-of-ordering of packets or frames, the same port must be used for packet flow. Identification of which port will be used for communication is based upon any of the following: source MAC address, destination MAC address, source IP address, destination IP address, or combinations of source and destination addresses. If source MAC is used, as an example, if station A on port 3 of SW1 is seeking to send a packet to station B on port 26 of SW2, then the last three bits of the source MAC address of station A, which are in the source address field of the packet, are used to generate a trunk port index. The trunk port index, which is then looked up on the trunk group table by the ingress submodule 14 of the particular port on the switch, in order to determine which port of the trunk group will be used for the communication. In other words, when a packet is sought to be sent from station A to station B, address resolution is conducted as set forth above. If the packet is to be handled through a trunk group, then a T bit will be set in the ARL entry which is matched by the destination address. If the T bit or trunk bit is set, then the destination address is learned from one of the trunk ports. The egress port, therefore, is not learned from the port number obtained in the ARL entry, but is instead learned from the trunk group ID and rules tag (RTAG) which is picked up from the ARL entry, and which can be used to identify the trunk port based upon the trunk port index contained in the trunk group table. The RTAG and TGID which are contained in the ARL entry therefore define which part of the packet is used to generate the trunk port index. For example, if the RTAG value is 1, then the last three bits of the source MAC address are used to identify the trunk port index; using the trunk group table, the trunk port index can then be used to identify the appropriate trunk port for communication. If the RTAG value is 2, then it is the last three bits of the destination MAC address which are used to generate the trunk port index. If the RTAG is 3, then the last three bits of the source MAC address are XORED with the last three bits of the destination MAC address. The result of this operation is used to generate the trunk port index. For IP packets, additional RTAG values are used so that the source IP and destination IP addresses are used for the trunk port index, rather than the MAC addresses. SOC 10 is configured such that if a trunk port goes down or fails for any reason, notification is sent through CMIC 40 to CPU 52. CPU 52 is then configured to automatically review the trunk group table, and VLAN tables to make sure that the appropriate port bit maps are changed to reflect the fact that a port has gone down and is therefore removed. Similarly, when the trunk port or link is reestablished, the process has to be reversed and a message must be sent to CPU 52 so that the VLAN tables, trunk group tables, etc. can be updated to reflect the presence of the trunk port.

Furthermore, it should be noted that since the trunk group is treated as a single logical link, the trunk group is configured to accept control frames or control packets, also known as BPDUs, only one of the trunk ports. The port based VLAN table, therefore, must be configured to reject incoming BPDUs of non-specified trunk ports. This rejection can be easily set by the setting of a B bit in the VLAN table. IEEE standard 802.1d defines an algorithm known as the spanning tree algorithm, for avoiding data loops in switches where trunk groups exist. Referring to FIG. 19, a logical loop could exist between ports 1 and 2 and switches SW1 and SW2. The spanning algorithm tree defines four separate states, with these states including disabling, blocking, listening, learning, and forwarding. The port based VLAN table is configured to enable CPU 52 to program the ports for a specific ARL state, so that the ARL logic takes the appropriate action on the incoming packets. As noted previously, the B bit in the VLAN table provides the capability to reject BPDUs. The St bit in the ARL table enables the CPU to learn the static entries; as noted in FIG. 18, static entries are not aged by the aging process. The hit bit in the ARL table, as mentioned previously, enables the ARL engine 143 to detect whether or not there was a hit on this entry. In other words, SOC 10 utilizes a unique configuration of ARL tables, VLAN tables, modules, etc. in order to provide an efficient silicon based implementation of the spanning tree states.

In certain situations, such as a destination lookup failure (DLF) where a packet is sent to all ports on a VLAN, or a multicast packet, the trunk group bit map table is configured to pickup appropriate port information so that the packet is not sent back to the members of the same source trunk group. This prevents unnecessary traffic on the LAN, and maintains the efficiency at the trunk group.

IP/IPX

Referring again to FIG. 14, each EPIC 20 or GPIC 30 can be configured to enable support of both IP and IPX protocol at linespeed. This flexibility is provided without having any negative effect on system performance, and utilizes a table, implemented in silicon, which can be selected for IP protocol, IPX protocol, or a combination of IP protocol and IPX protocol. This capability is provided within logic circuitry 1411, and utilizes an IP longest prefix cache lookup (IP_LPC), and an IPX longest prefix cache lookup (IPX_LPC). During the layer 3 lookup, a number of concurrent searches are performed; an L3 fast lookup, and the IP longest prefix cache lookup, are concurrently performed if the packet is identified by the packet header as an IP packet. If the packet header identifies the packet as an IPX packet, the L3 fast lookup and the IPX longest prefix cache lookup will be concurrently performed. It should be noted that ARL/L3 tables 21/31 include an IP default router table which is utilized for an IP longest prefix cache lookup when the packet is identified as an IP packet, and also includes an IPX default router table which is utilized when the packet header identifies the packet as an IPX packet. Appropriate hexadecimal codes are used to determine the packet types. If the packet is identified as neither an IP packet nor an IPX packet, the packet is directed to CPU 52 via CPS channel 80 and CMIC 40. It should be noted that if the packet is identified as an IPX packet, it could be any one of four types of IPX packets. The four types are Ethernet 802.3, Ethernet 802.2, Ethernet SNAP, and Ethernet II.

The concurrent lookup of L3 and either IP or IPX are important to the performance of SOC 10. In one configuration of SOC 10, the L3 table would include a portion which has IP address information, and another portion which has IPX information, as the default router tables. These default router tables, as noted previously, are searched depending upon whether the packet is an IP packet or an IPX packet. In order to more clearly illustrate the tables, the L3 table format for an L3 table within ARL/L3 tables 21 is as follows:

IP or IPX Address—32 bits long—IP or IPX Address—is a 32 bit IP or IPX Address. The Destination IP or IPX Address in a packet is used as a key in searching this table.

Mac Address—48 bits long—Mac Address is really the next Hop Mac Address. This Mac address is used as the Destination Mac Address in the forwarded IP Packet.

Port Number—6 bits long—Port Number—is the port number the packet has to go out if the Destination IP Address matches this entry's IP Address.

L3 Interface Num—5 bits long—L3 Interface Num—This L3 Interface Number is used to get the Router Mac Address from the L3 Interface Table.

L3 Hit Bit—1 bit long—L3 Hit bit—is used to check if there is hit on this Entry. The hit bit is set when the Source IP Address search matches this entry. The L3 Aging Process ages the entry if this bit is not set.

Frame Type—2 bits long—Frame Type indicates type of IPX Frame (802.2, Ethernet II, SNAP and 802.3) accepted by this IPX Node. Value 00—Ethernet II Frame. Value 01—SNAP Frame. Value 02—802.2 Frame. Value 03—802.3 Frame.

Reserved—4 bits long—Reserved for future use.

The fields of the default IP router table are as follows:

IP Subnet Address—32 bits long—IP Subnet Address—is a 32 bit IP Address of the Subnet.

Mac Address—48 bits long—Mac Address is really the next Hop Mac Address and in this case is the Mac Address of the default Router.

Port Number—6 bits long—Port Number is the port number forwarded packet has to go out.

L3 Interface Num—5 bits long—L3 Interface Num is L3 Interface Number.

IP Subnet Bits—5 bits long—IP Subnet Bits is total number of Subnet Bits in the Subnet Mask. These bits are ANDED with Destination IP Address before comparing with Subnet Address.

C Bit—1 bit long—C Bit—If this bit is set then send the packet to CPU also.

The fields of the default IPX router table within ARL/L3 tables 21 are as follows:

IPX Subnet Address—32 bits long—IPX Subnet Address is a 32 bit IPX Address of the Subnet.

Mac Address—48 bits long—Mac Address is really the next Hop Mac Address and in this case is the Mac Address of the default Router.

Port Number—6 bits long—Port Number is the port number forwarded packet has to go out.

L3 Interface Num—5 bits long—L3 Interface Num is L3 Interface Number.

IPX Subnet Bits—5 bits long—IPX Subnet Bits is total number of Subnet Bits in the Subnet Mask. These bits are ANDED with Destination IPX Address before comparing with Subnet Address.

C Bit—1 bit long—C Bit—If this bit is set then send the packet to CPU also.

If a match is not found in the L3 table for the destination IP address, longest prefix match in the default IP router fails, then the packet is given to the CPU. Similarly, if a match is not found on the L3 table for a destination IPX address, and the longest prefix match in the default IPX router fails, then the packet is given to the CPU. The lookups are done in parallel, but if the destination IP or IPX address is found in the L3 table, then the results of the default router table lookup are abandoned.

The longest prefix cache lookup, whether it be for IP or IPX, includes repetitive matching attempts of bits of the IP subnet address. The longest prefix match consists of ANDing the destination IP address with the number of IP or IPX subnet bits and comparing the result with the IP subnet address. Once a longest prefix match is found, as long as the TTL is not equal to one, then appropriate IP check sums are recalculated, the destination MAC address is replaced with the next hop MAC address, and the source MAC address is replaced with the router MAC address of the interface. The VLAN ID is obtained from the L3 interface table, and the packet is then sent as either tagged or untagged, as appropriate. If the C bit is set, a copy of the packet is sent to the CPU as may be necessary for learning or other CPU-related functions.

It should be noted, therefore, that if a packet arrives destined to a MAC address associated with a level 3 interface for a selected VLAN, the ingress looks for a match at an IP/IPX destination subnet level. If there is no IP/IPX destination subnet match, the packet is forwarded to CPU 52 for appropriate routing. However, if an IP/IPX match is made, then the MAC address of the next hop and the egress port number is identified and the packet is appropriately forwarded.

In other words, the ingress of the EPIC 20 or GPIC 30 is configured with respect to ARL/L3 tables 21 so that when a packet enters ingress submodule 14, the ingress can identify whether or not the packet is an IP packet or an IPX packet. IP packets are directed to an IP/ARL lookup, and IPX configured packets are directed to an IPX/ARL lookup. If an L3 match is found during the L3 lookup, then the longest prefix match lookups are abandoned.

HOL Blocking

SOC 10 incorporates some unique data flow characteristics, in order maximize efficiency and switching speed. In network communications, a concept known as head-of-line or HOL blocking occurs when a port is attempting to send a packet to a congested port, and immediately behind that packet is another packet which is intended to be sent to an un-congested port. The congestion at the destination port of the first packet would result in delay of the transfer of the second packet to the un-congested port. Each EPIC 20 and GPIC 30 within SOC 10 includes a unique HOL blocking mechanism in order to maximize throughput and minimize the negative effects that a single congested port would have on traffic going to un-congested ports. For example, if a port on a GPIC 30, with a data rate of, for example, 1000 megabits per second is attempting to send data to another port 24a on EPIC 20a, port 24a would immediately be congested. Each port on each GPIC 30 and EPIC 20 is programmed by CPU 52 to have a high watermark and a low watermark per port per class of service (COS), with respect to buffer space within CBP 50. The fact that the head of line blocking mechanism enables per port per COS head of line blocking prevention enables a more efficient data flow than that which is known in the art. When the output queue for a particular port hits the preprogrammed high watermark within the allocated buffer in CBP 50, PMMU 70 sends, on S channel 83, a COS queue status notification to the appropriate ingress module of the appropriate GPIC 30 or EPIC 20. When the message is received, the active port register corresponding to the COS indicated in the message is updated. If the port bit for that particular port is set to zero, then the ingress is configured to drop all packets going to that port. Although the dropped packets will have a negative effect on communication to the congested port, the dropping of the packets destined for congested ports enables packets going to un-congested ports to be expeditiously forwarded thereto. When the output queue goes below the preprogrammed low watermark, PMMU 70 sends a COS queue status notification message on the sideband channel with the bit set for the port. When the ingress gets this message, the bit corresponding to the port in the active port register for the module can send the packet to the appropriate output queue. By waiting until the output queue goes below the low watermark before re-activating the port, a hysteresis is built into the system to prevent constant activation and deactivation of the port based upon the forwarding of only one packet, or a small number of packets. It should be noted that every module has an active port register. As an example, each COS per port may have four registers for storing the high watermark and the low watermark; these registers can store data in terms of number of cells on the output queue, or in terms of number of packets on the output queue. In the case of a unicast message, the packet is merely dropped; in the case of multicast or broadcast messages, the message is dropped with respect to congested ports, but forwarded to uncongested ports. PMMU 70 includes all logic required to implement this mechanism to prevent HOL blocking, with respect to budgeting of cells and packets. PMMU 70 includes an HOL blocking marker register to implement the mechanism based upon cells. If the local cell count plus the global cell count for a particular egress port exceeds the HOL blocking marker register value, then PMMU 70 sends the HOL status notification message. PMMU 70 can also implement an early HOL notification, through the use of a bit in the PMMU configuration register which is referred to as a Use Advanced Warning Bit. If this bit is set, the PMMU 70 sends the HOL notification message if the local cell count plus the global cell count plus 121 is greater than the value in the HOL blocking marker register. 121 is the number of cells in a jumbo frame.

With respect to the hysteresis discussed above, it should be noted that PMMU 70 implements both a spatial and a temporal hysteresis. When the local cell count plus global cell count value goes below the value in the HOL blocking marker register, then a poaching timer value from a PMMU configuration register is used to load into a counter. The counter is decremented every 32 clock cycles. When the counter reaches 0, PMMU 70 sends the HOL status message with the new port bit map. The bit corresponding to the egress port is reset to 0, to indicate that there is no more HOL blocking on the egress port. In order to carry on HOL blocking prevention based upon packets, a skid mark value is defined in the PMMU configuration register. If the number of transaction queue entries plus the skid mark value is greater than the maximum transaction queue size per COS, then PMMU 70 sends the COS queue status message on the S channel. Once the ingress port receives this message, the ingress port will stop sending packets for this particular port and COS combination: Depending upon the configuration and the packet length received for the egress port, either the head of line blocking for the cell high watermark or the head of line blocking for the packet high watermark may be reached first. This configuration, therefore, works to prevent either a small series of very large packets or a large series of very small packets from creating HOL blocking problems.

The low watermark discussed previously with respect to CBP admission logic is for the purpose of ensuring that independent of traffic conditions, each port will have appropriate buffer space allocated in the CBP to prevent port starvation, and ensure that each port will be able to communicate with every other port to the extent that the network can support such communication.

Referring again to PMMU 70 illustrated in FIG. 10, CBM 71 is configured to maximize availability of address pointers associated with incoming packets from a free address pool. CBM 71, as noted previously, stores the first cell pointer until incoming packet 112 is received and assembled either in CBP 50, or GBP 60. If the purge flag of the corresponding P channel message is set, CBM 71 purges the incoming data packet 112, and therefore makes the address pointers GPID/CPID associated with the incoming packet to be available. When the purge flag is set, therefore, CBM 71 essentially flushes or purges the packet from processing of SOC 10, thereby preventing subsequent communication with the associated egress manager 76 associated with the purged packet. CBM 71 is also configured to communicate with egress managers 76 to delete aged and congested packets. Aged and congested packets are directed to CBM 71 based upon the associated starting address pointer, and the reclaim unit within CBM 71 frees the pointers associated with the packets to be deleted; this is, essentially, accomplished by modifying the free address pool to reflect this change. The memory budget value is updated by decrementing the current value of the associated memory by the number of data cells which are purged.

To summarize, resolved packets are placed on C channel 81 by ingress submodule 14 as discussed with respect to FIG. 8. CBM 71 interfaces with the CPS channel, and every time there is a cell/packet addressed to an egress port, CBM 71 assigns cell pointers, and manages the linked list. A plurality of concurrent reassembly engines are provided, with one reassembly engine for each egress manager 76, and tracks the frame status. Once a plurality of cells representing a packet is fully written into CBP 50, CBM 71 sends out CPIDs to the respective egress managers, as discussed above. The CPIDs point to the first cell of the packet in the CBP; packet flow is then controlled by egress managers 76 to transaction MACs 140 once the CPID/GPID assignment is completed by CBM 71. The budget register (not shown) of the respective egress manager 76 is appropriately decremented by the number of cells associated with the egress, after the complete packet is written into the CBP 50. EGM 76 writes the appropriate PIDs into its transaction FIFO. Since there are multiple classes of service (COSs), then the egress manager 76 writes the PIDs into the selected transaction FIFO corresponding to the selected COS. As will be discussed below with respect to FIG. 13, each egress manager 76 has its own scheduler interfacing to the transaction pool or transaction FIFO on one side, and the packet pool or packet FIFO on the other side. The transaction FIFO includes all PIDs, and the packet pool or packet FIFO includes only CPIDs. The packet FIFO interfaces to the transaction FIFO, and initiates transmission based upon requests from the transmission MAC. Once transmission is started, data is read from CBP 50 one cell at a time, based upon transaction FIFO requests.

Figure 13:
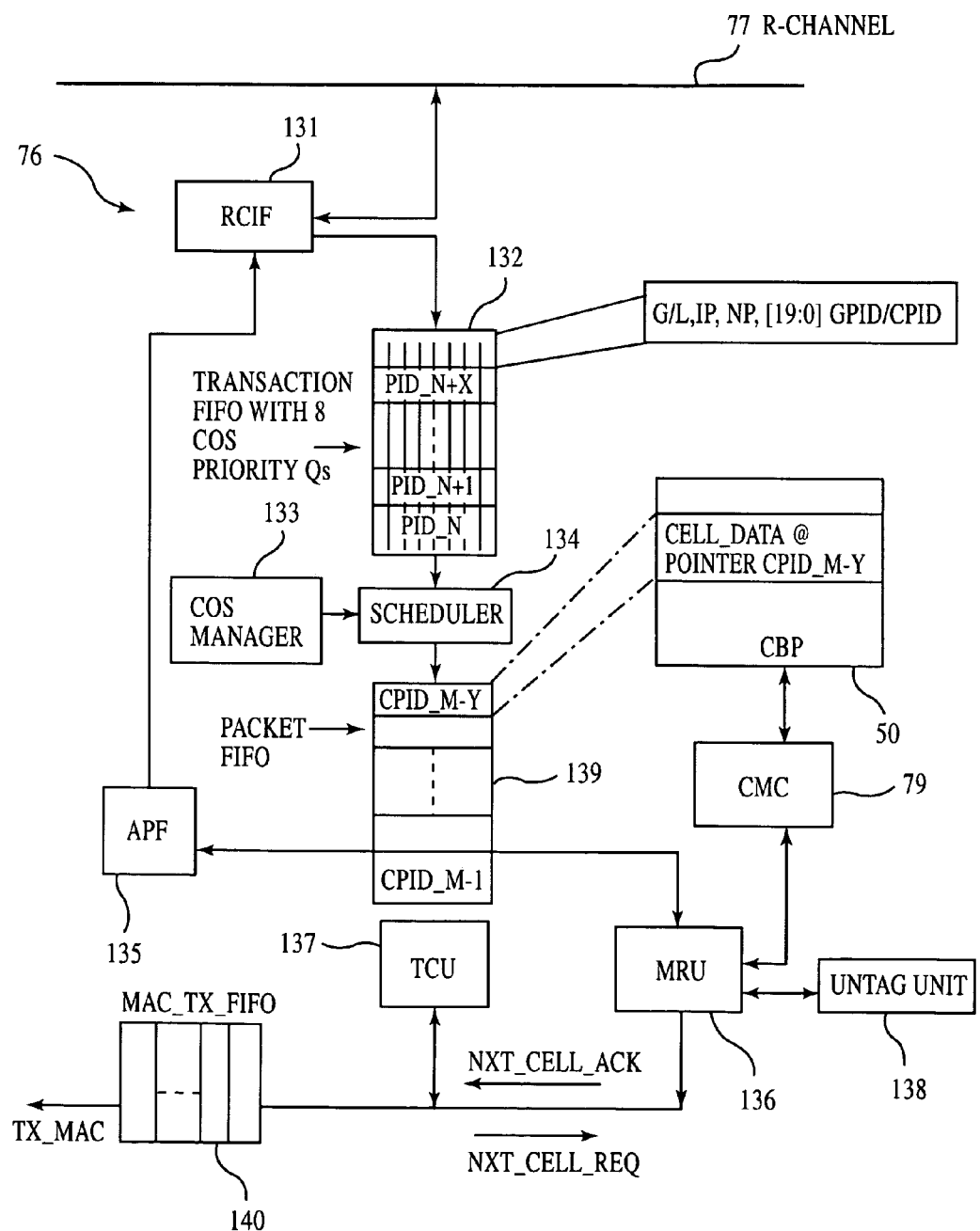
FIG. 13 illustrates a block diagram of an egress manager 76 illustrated in FIG. 10.

As noted previously, there is one egress manager for each port of every EPIC 20 and GPIC 30, and is associated with egress sub-module 18. FIG. 13 illustrates a block diagram of an egress manager 76 communicating with R channel 77. For each data packet 112 received by an ingress submodule 14 of an EPIC 20 of SOC 10, CBM 71 assigns a Pointer Identification (PID); if the packet 112 is admitted to CBP 50, the CBM 71 assigns a CPID, and if the packet 112 is admitted to GBP 60, the CBM 71 assigns a GPID number. At this time, CBM 71 notifies the corresponding egress manager 76 which will handle the packet 112, and passes the PID to the corresponding egress manager 76 through R channel 77. In the case of a unicast packet, only one egress manager 76 would receive the PID. However, if the incoming packet were a multicast or broadcast packet, each egress manager 76 to which the packet is directed will receive the PID. For this reason, a multicast or broadcast packet needs only to be stored once in the appropriate memory, be it either CBP 50 or GBP 60.

Each egress manager 76 includes an R channel interface unit (RCIF) 131, a transaction FIFO 132, a COS manager 133, a scheduler 134, an accelerated packet flush unit (APF) 135, a memory read unit (MRU) 136, a time stamp check unit (TCU) 137, and an untag unit 138. MRU 136 communicates with CMC 79, which is connected to CBP 50. Scheduler 134 is connected to a packet FIFO 139. RCIF 131 handles all messages between CBM 71 and egress manager 76. When a packet 112 is received and stored in SOC 10, CBM 71 passes the packet information to RCIF 131 of the associated egress manager 76. The packet information will include an indication of whether or not the packet is stored in CBP 50 or GBP 70, the size of the packet, and the PID. RCIF 131 then passes the received packet information to transaction FIFO 132. Transaction FIFO 132 is a fixed depth FIFO with eight COS priority queues, and is arranged as a matrix with a number of rows and columns. Each column of transaction FIFO 132 represents a class of service (COS), and the total number of rows equals the number of transactions allowed for any one class of service. COS manager 133 works in conjunction with scheduler 134 in order to provide policy based quality of service (QOS), based upon Ethernet standards. As data packets arrive in one or more of the COS priority queues of transaction FIFO 132, scheduler 134 directs a selected packet pointer from one of the priority queues to the packet FIFO 139. The selection of the packet pointer is based upon a queue scheduling algorithm, which is programmed by a user through CPU 52, within COS manager 133. An example of a COS issue is video, which requires greater bandwidth than text documents. A data packet 112 of video information may therefore be passed to packet FIFO 139 ahead of a packet associated with a text document. The COS manager 133 would therefore direct scheduler 134 to select the packet pointer associated with the packet of video data.

The COS manager 133 can also be programmed using a strict priority based scheduling method, or a weighted priority based scheduling method of selecting the next packet pointer in transaction FIFO 132. Utilizing a strict priority based scheduling method, each of the eight COS priority queues are provided with a priority with respect to each other COS queue. Any packets residing in the highest priority COS queue are extracted from transaction FIFO 132 for transmission. On the other hand, utilizing a weighted priority based scheduling scheme, each COS priority queue is provided with a programmable bandwidth. After assigning the queue priority of each COS queue, each COS priority queue is given a minimum and a maximum bandwidth. The minimum and maximum bandwidth values are user programmable. Once the higher priority queues achieve their minimum bandwidth value, COS manager 133 allocates any remaining bandwidth based upon any occurrence of exceeding the maximum bandwidth for any one priority queue. This configuration guarantees that a maximum bandwidth will be achieved by the high priority queues, while the lower priority queues are provided with a lower bandwidth.

The programmable nature of the COS manager enables the scheduling algorithm to be modified based upon a users specific needs. For example, COS manager 133 can consider a maximum packet delay value which must be met by a transaction FIFO queue. In other words, COS manager 133 can require that a packet 112 is not delayed in transmission by the maximum packet delay value; this ensures that the data flow of high speed data such as audio, video, and other real time data is continuously and smoothly transmitted.

If the requested packet is located in CBP 50, the CPID is passed from transaction FIFO 132 to packet FIFO 139. If the requested packet is located in GBP 60, the scheduler initiates a fetch of the packet from GBP 60 to CBP 50; packet FIFO 139 only utilizes valid CPID information, and does not utilize GPID information. The packet FIFO 139 only communicates with the CBP and not the GBP. When the egress seeks to retrieve a packet, the packet can only be retrieved from the CBP; for this reason, if the requested packet is located in the GBP 50, the scheduler fetches the packet so that the egress can properly retrieve the packet from the CBP.

APF 135 monitors the status of packet FIFO 139. After packet FIFO 139 is full for a specified time period, APF 135 flushes out the packet FIFO. The CBM reclaim unit is provided with the packet pointers stored in packet FIFO 139 by APF 135, and the reclaim unit is instructed by APF 135 to release the packet pointers as part of the free address pool. APF 135 also disables the ingress port 21 associated with the egress manager 76.

While packet FIFO 139 receives the packet pointers from scheduler 134, MRU 136 extracts the packet pointers for dispatch to the proper egress port. After MRU 136 receives the packet pointer, it passes the packet pointer information to CMC 79, which retrieves each data cell from CBP 50. MRU 136 passes the first data cell 112a, incorporating cell header information, to TCU 137 and untag unit 138. TCU 137 determines whether the packet has aged by comparing the time stamps stored within data cell 112a and the current time. If the storage time is greater than a programmable discard time, then packet 112 is discarded as an aged packet. Additionally, if there is a pending request to untag the data cell 112a, untag unit 138 will remove the tag header prior to dispatching the packet. Tag headers are defined in IEEE Standard 802.1q.

Egress manager 76, through MRU 136, interfaces with transmission FIFO 140, which is a transmission FIFO for an appropriate media access controller (MAC); media access controllers are known in the Ethernet art. MRU 136 prefetches the data packet 112 from the appropriate memory, and sends the packet to transmission FIFO 140, flagging the beginning and the ending of the packet. If necessary, transmission FIFO 140 will pad the packet so that the packet is 64 bytes in length.

As shown in FIG. 9, packet 112 is sliced or segmented into a plurality of 64 byte data cells for handling within SOC 10. The segmentation of packets into cells simplifies handling thereof, and improves granularity, as well as making it simpler to adapt SOC 10 to cell-based protocols such as ATM. However, before the cells are transmitted out of SOC 10, they must be reassembled into packet format for proper communication in accordance with the appropriate communication protocol. A cell reassembly engine (not shown) is incorporated within each egress of SOC 10 to reassemble the sliced cells 112a and 112b into an appropriately processed and massaged packet for further communication.

Figure 16:
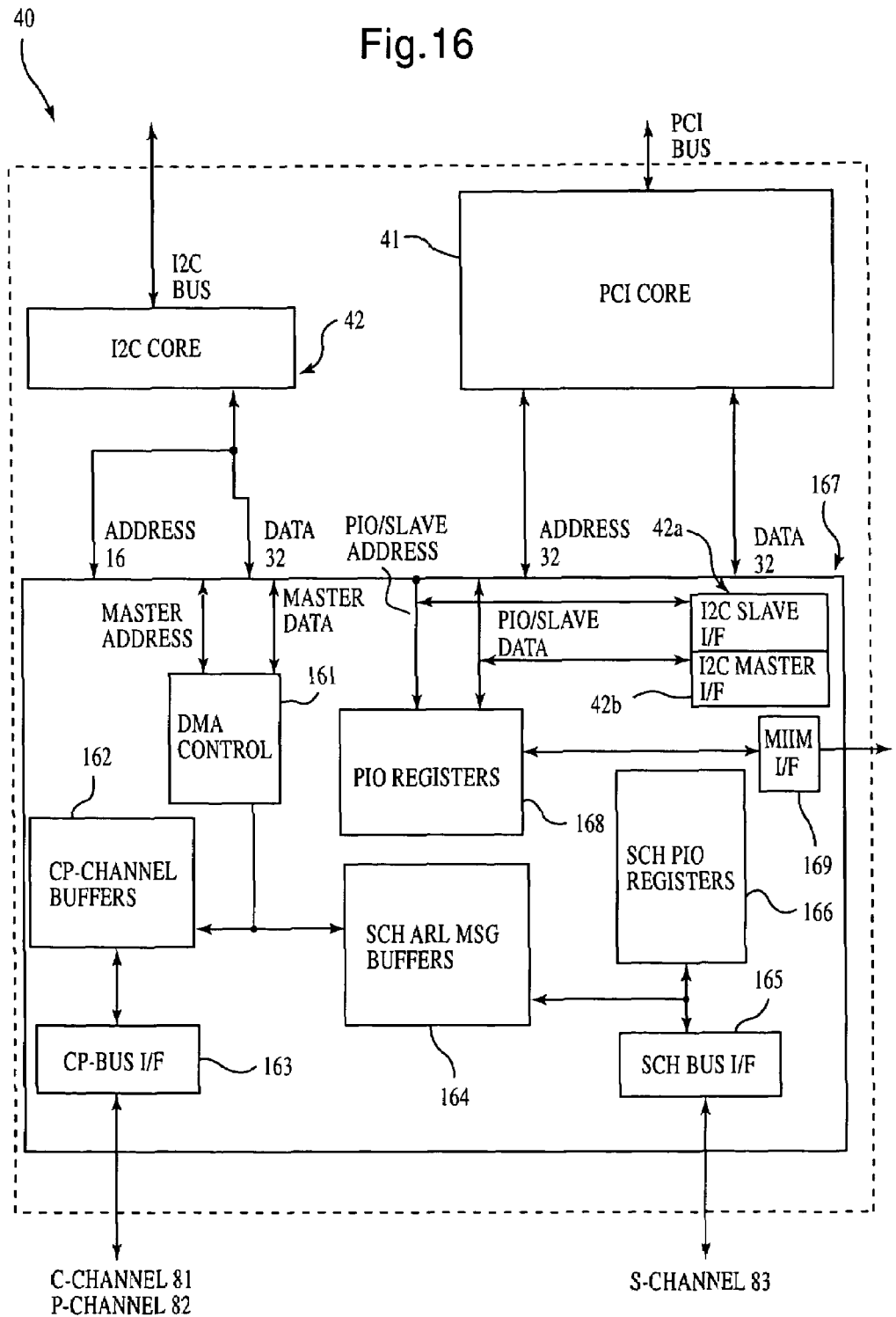
FIG. 16 is a block diagram of the elements of CMIC 40.

FIG. 16 is a block diagram showing some of the elements of CPU interface or CMIC 40. In the exemplary configuration of the network switch, CMIC 40 provides a 32 bit 66 MHz PCI interface, as well as an I2C interface between SOC 10 and external CPU 52. PCI communication is controlled by PCI core 41, and I2C communication is performed by I2C core 42, through CMIC bus 167. As shown in the figure, many CMIC 40 elements communicate with each other through CMIC bus 167. The PCI interface is typically used for configuration and programming of SOC 10 elements such as rules tables, filter masks, packet handling, etc., as well as moving data to and from the CPU or other PCI uplink. The PCI interface is suitable for high end systems wherein CPU 52 is a powerful CPU and running a sufficient protocol stack as required to support layer two and layer three switching functions. The I2C interface is suitable for low end systems, where CPU 52 is primarily used for initialization. Low end systems would seldom change the configuration of SOC 10 after the switch is up and running.

CPU 52 is treated by SOC 10 as any other port. Therefore, CMIC 40 must provide necessary port functions much like other port functions defined above. CMIC 40 supports all S channel commands and messages, thereby enabling CPU 52 to access the entire packet memory and register set; this also enables CPU 52 to issue insert and delete entries into ARL/L3 tables, issue initialize CFAP/SFAP commands, read/write memory commands and ACKs, read/write register command and ACKs, etc. Internal to SOC 10, CMIC 40 interfaces to C channel 81, P channel 82, and S channel 83, and is capable of acting as an S channel master as well as S channel slave. To this end, CPU 52 must read or write 32-bit D words. For ARL table insertion and deletion, CMIC 40 supports buffering of four insert/delete messages which can be polled or interrupt driven. ARL messages can also be placed directly into CPU memory through a DMA access using an ARL DMA controller 161. DMA controller 161 can interrupt CPU 52 after transfer of any ARL message, or when all the requested ARL packets have been placed into CPU memory.

Communication between CMIC 40 and C channel 81/P channel 82 is performed through the use of CP-channel buffers 162 for buffering C and P channel messages, and CP bus interface 163. S channel ARL message buffers 164 and S channel bus interface 165 enable communication with S channel 83. As noted previously, PIO (Programmed Input/Output) registers are used, as illustrated by SCH PIO registers 166 and PIO registers 168, to access the S channel, as well as to program other control, status, address, and data registers. PIO registers 168 communicate with CMIC bus 167 through I2C slave interface 42a and I2C master interface 42b. DMA controller 161 enables chaining, in memory, thereby allowing CPU 52 to transfer multiple packets of data without continuous CPU intervention. Each DMA channel can therefore be programmed to perform a read or write DMA operation. Specific descriptor formats may be selected as appropriate to execute a desired DMA function according to application rules. For receiving cells from PMMU 70 for transfer to memory, if appropriate, CMIC 40 acts as an egress port, and follows egress protocol as discussed previously. For transferring cells to PMMU 70, CMIC 40 acts as an ingress port, and follows ingress protocol as discussed previously. CMIC 40 checks for active ports, COS queue availability and other ingress functions, as well as supporting the HOL blocking mechanism discussed above. CMIC 40 supports single and burst PIO operations; however, burst should be limited to S channel buffers and ARL insert/delete message buffers. Referring once again to I2C slave interface 42a, the CMIC 40 is configured to have an I2C slave address so that an external I2C master can access registers of CMIC 40. CMIC 40 can inversely operate as an I2C master, and therefore, access other I2C slaves. It should be noted that CMIC 40 can also support MIIM through MIIM interface 169. MIIM support is defined by IEEE Standard 802.3u, and will not be further discussed herein. Similarly, other operational aspects of CMIC 40 are outside of the scope of this invention.

A unique and advantageous aspect of SOC 10 is the ability of doing concurrent lookups with respect to layer two (ARL), layer three, and filtering. When an incoming packet comes in to an ingress submodule 14 of either an EPIC 20 or a GPIC 30, as discussed previously, the module is capable of concurrently performing an address lookup to determine if the destination address is within a same VLAN as a source address; if the VLAN IDs are the same, layer 2 or ARL lookup should be sufficient to properly switch the packet in a store and forward configuration. If the VLAN IDs are different, then layer three switching must occur based upon appropriate identification of the destination address, and switching to an appropriate port to get to the VLAN of the destination address. Layer three switching, therefore, must be performed in order to cross VLAN boundaries. Once SOC 10 determines that L3 switching is necessary, SOC 10 identifies the MAC address of a destination router, based upon the L3 lookup. L3 lookup is determined based upon a reading in the beginning portion of the packet of whether or not the L3 bit is set. If the L3 bit is set, then L3 lookup will be necessary in order to identify appropriate routing instructions. If the lookup is unsuccessful, a request is sent to CPU 52 and CPU 52 takes appropriate steps to identify appropriate routing for the packet. Once the CPU has obtained the appropriate routing information, the information is stored in the L3 lookup table, and for the next packet, the lookup will be successful and the packet will be switched in the store and forward configuration.

VOIP in a Network Switch

The following discussion is directed to a VOIP configuration of the present invention. Traditionally, a typical telephone call in a Public Switch Telephone Network (PTSN) requires the allocation of an exclusive full duplex transmission circuit between the parties of the call. As a result of this exclusivity, any unused bandwidth of the circuit is essentially lost, as other calls cannot share the circuit. This loss is appreciable, as typical telephone calls generally utilize less than 50% of the available bandwidth of the exclusive circuit as a result of the simplex nature of calls—e.g. one person talks while another listens with silence between switching from one person to another talking. Therefore, it is apparent that typical PSTN calls through dedicated circuits utilize far more resources/bandwidth than necessary.

As a result of this inefficient use of resources, VOIP telephony systems are an appealing alternative to PSTN calls in various situations. In particular, VOIP systems are appealing as they do not pre-allocate dedicated circuits for each call, which minimizes resources used. Further, VOIP systems share common bandwidths, which allows a far greater number of calls to be connected using less resources, and often times completely avoiding the costs associated with PSTN service.

Figure 20:
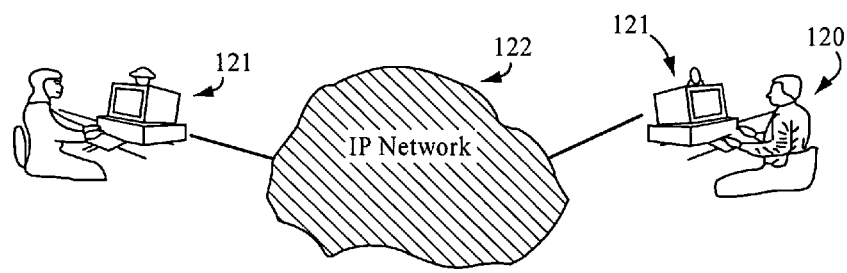
FIG. 20 illustrates a exemplary PC to PC VOIP session.

An illustrative VOIP system configuration is the personal computer (PC) to personal computer audio conversation configuration, which is generally illustrated in FIG. 20. In this configuration, two PC's 121, each with multimedia capability, allow users 120 to converse with each other through an IP network 122. In this type of system and/or configuration, all of the call signaling, compression, and transmission decisions are carried out within the respective PC's and simply transmitted over an IP data network 122.

Figure 21:
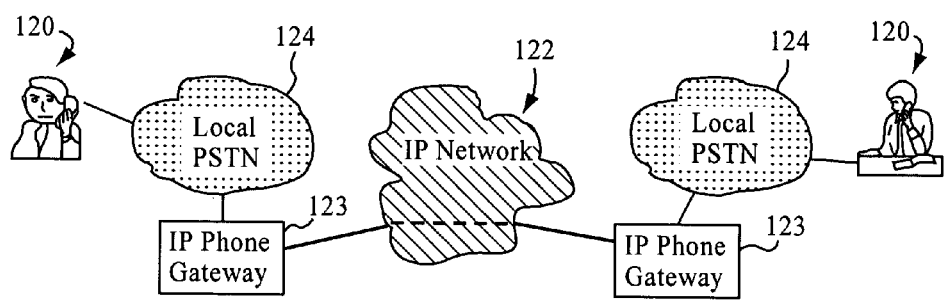
FIG. 21 illustrates an exemplary long-distance VOIP session.

In another VOIP configuration shown in FIG. 21, VOIP systems can be used as an alternative to long distance telephone carriers. In this configuration, an IP network 122 serves as an alternative to the traditional long distance carriers, as the end users 120 communicate with each other through PC's 121 and/or IP phones interconnected through a local PSTN 124, which does not charge a toll for the call, to a local gateway 123. The local gateways 123 are then interconnected via IP network 122, which completes the circuit between users 120. However, use of a system shown in either FIG. 20 or 21 to complete a local or long distance call through an IP network requires the use of a high-speed data access system from each of the end users 120. Further, special equipment is required in order to create the above noted configurations. In particular, special IP phones capable of connecting a high speed data transmission device of a PC, e.g. a modem, are required, special modems having IP phone capability and connections are required, and adapters to connect a high speed data transmission device to an analog phone line leading to the service provider are generally required.

Figure 22:
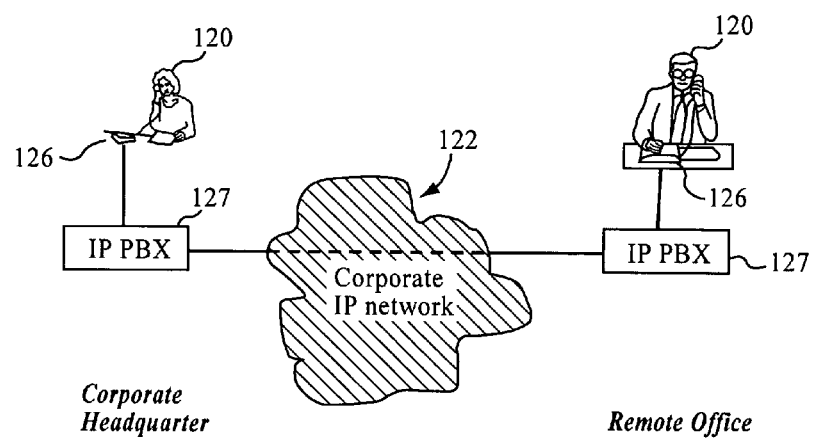
FIG. 22 illustrates an exemplary IP PBX VOIP configuration.

Alternatively, in corporate situations, for example, another configuration for a VOIP application is illustrated in FIG. 22. In this situation IP PBX phones 126 are used to connect multiple offices of the corporation together via the corporate data network 122, often termed a Corporate WAN. In order to support this form of VOIP, the functions of the IP phone gateway, PBX, and a call center are combined in a turnkey solution in the form of the IP PBX phone network interconnected via the corporate data network 122. Therefore, the IP PBX 127 and the IP phone 126 are then elements of the corporate WAN connection, and thus, are associated with specific addresses thereon. Additionally, the IP PBX 127 also generally includes an interface with a PSTN, so that the phones on the WAN can then be connected other phones not on the network.

In each of the above noted configurations, the key to successful operation is the transmission of the VOIP packets through the data network portion of the configuration. In particular, voice traffic has different surrounding characteristics from general data traffic, as voice traffic is "real-time" traffic that is sensitive to latency and packet loss. Therefore drops and/or delays of VOIP packet transmission in a data network can adversely affect the quality of the VOIP transmission. Substantial drops or delays can easily render VOIP transmissions unintelligible at the receiving end. Generally speaking, the maximum round-trip delay for a VOIP system is approximately 250 to 300 ms, which serves as a sort of benchmark for VOIP systems high water marks, as latency of over 300 ms is generally intolerable by the users. Therefore, the rate and timing of the VOIP data transmission through the data network clearly is a determining factor in the success of a VOIP system.

Figure 23:
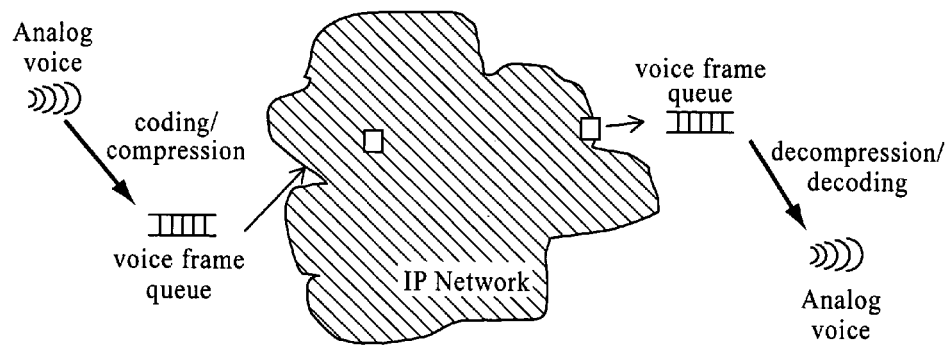
FIG. 23 illustrates an exemplary VOIP packet linking and compression scheme.

Turning to the data transmission portion of general VOIP systems, when a voice conversation is transmitted through a data network, it must first be broken down in to small "pieces" of audio. Each of these pieces, termed a voice packet or voice frame, consists of a very short duration, generally from 10 to 30 ms, of audio. A string of voice packets, which when assembled form a continuous audio stream, are generally compressed, linked together with a common packet header, and transmitted through the data network to the destination IP address. This process, which is generally shown in FIG. 23, suffers from the fact that in order to adequately send VOIP through the network given normal congestion and available bandwidths, high compression values are required. Since achieving high compression values is inherently associated with additional processing time, voice packets often begin the transmission phase already delayed as a result of the time necessary to accomplish adequate compression. Therefore, any additional delays, such as delays resulting from network congestion, will generate excessive latency and render the resulting audio at the receiving end unintelligible or of generally poor quality.

Generally speaking, the present invention is configured to address the delays resulting from network congestion through the use of a data classification/prioritization system. The data classification system of the present invention essentially functions to assign a weighted priority to a VOIP packet traveling though a data network, thus allowing the VOIP data to be transmitted and or switched through the network ahead of data packets having a lesser priorities associated therewith. This configuration essentially eliminates transmission delays for VOIP packets as a result of network congestion. Furthermore, the present invention is configured to monitor packets being transmitted through a data network, identify the initialization of a VOIP session, determine a parameter associated with all subsequent VOIP packets for the session, and associate a priority with the subsequent packets so that they may avoid network congestion. This configuration allows the structure and method of the present exemplary embodiment to be compatible with various VOIP systems, which results in a more user friendly and compatible system.

Figure 24:
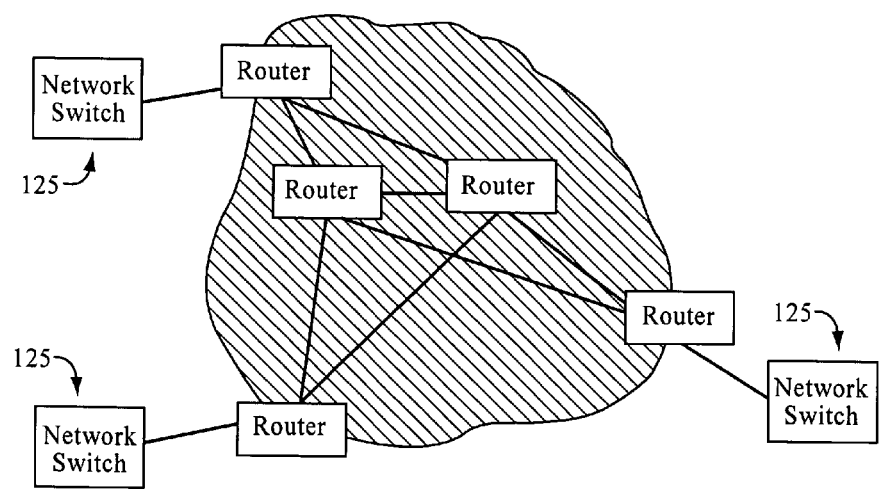
FIG. 24 illustrates a general VOIP configuration using a data network.

More particularly, the present invention uses COS sensitive-type network switches positioned at the boundary or edge of a data network, wherein these switches are configured to perform layer two through layer seven switching, as determined by the Open Systems Interconnect 7-layer reference model, in order to minimize latency for VOIP packets. These network switches are further configured to distinguish data traffic passing therethrough based upon the content of the data and/or the source/destination of the data, and thereafter, apply traffic control based upon the distinguishment through the use of a fast filtering processor. A general illustration of a configuration of the invention is shown in FIG. 24. Each of network switches 125, which are generally equivalent to the exemplary network switch (SOC 10) described above, which are positioned on the outer edge or boundary of IP network 122, and are configured to utilize the fast filtering processor (FFP) 141 to identify VOIP related packets and take appropriate actions upon the identified packets in order to facilitate transmission of the VOIP related packets through the network. The fast filtering processor 141 of network switch 125 operates to apply the filter mask discussed above to the packet header of every packet coming through network switch 125. Upon applying the mask to the packet header, the remaining information is then compared to entries residing in rules table 22 located in the network switch 125. If a match is found between the masked information from the packet header and an entry in the rules table 22 of the network switch, then the fast filtering processor 141 takes an action upon the packet in accordance with a predetermined action field stored in the network switch. Alternatively, an exclusive filter scheme could be employed, wherein a no-match state triggered taking action in accordance with the action fields. Nonetheless, the actions corresponding to the predetermined action field may include changing or modifying the class of service, for example the Layer 2 priority associated with the packet, changing the type of service (TOS) associated with the packet, modifying the differentiated services code point (DSCP) associated with the packet, sending the packet to a queue for a predetermined Class of Service (COS), sending the packet to the CPU via the CPU interface, or discarding the packet, in addition to other switching actions. Therefore, in order to facilitate expeditious processing of VOIP data packets through network switch 125, specific rules relating to VOIP data packets are predefined in the action fields of network switch 125. With these fields predefined, when a VOIP data packet is transmitted through network switch 125, the fast filtering processor 141 identifies the packet as a VOIP data packet, and can then take action on the packet to increase the likelihood that the packet will be transmitted through the data network with minimal delays. More particularly, the action fields can be preset to modify the TOS, or other relevant fields of the VOIP data packets, such that VOIP traffic is given priority over other traffic that is not as sensitive to transmission delays.

However, prior to modifying the TOS fields, or other related fields of VOIP packets traveling through network switch 125, the present invention may also be configured to examine or snoop into packets traveling through network switch 125 to identify and trap packets associated with the initial setup of a VOIP type session. Upon trapping a VOIP session setup message, the present invention is configured to dynamically generate and store case/session specific action fields in network switch 125 corresponding the specific VOIP session, thereby enabling subsequent traffic related to the specific VOIP session to be easily trapped and appropriately prioritized. However, in order to discuss this process in detail, a general discussion of VOIP session setup procedures is necessary.

Figure 25:
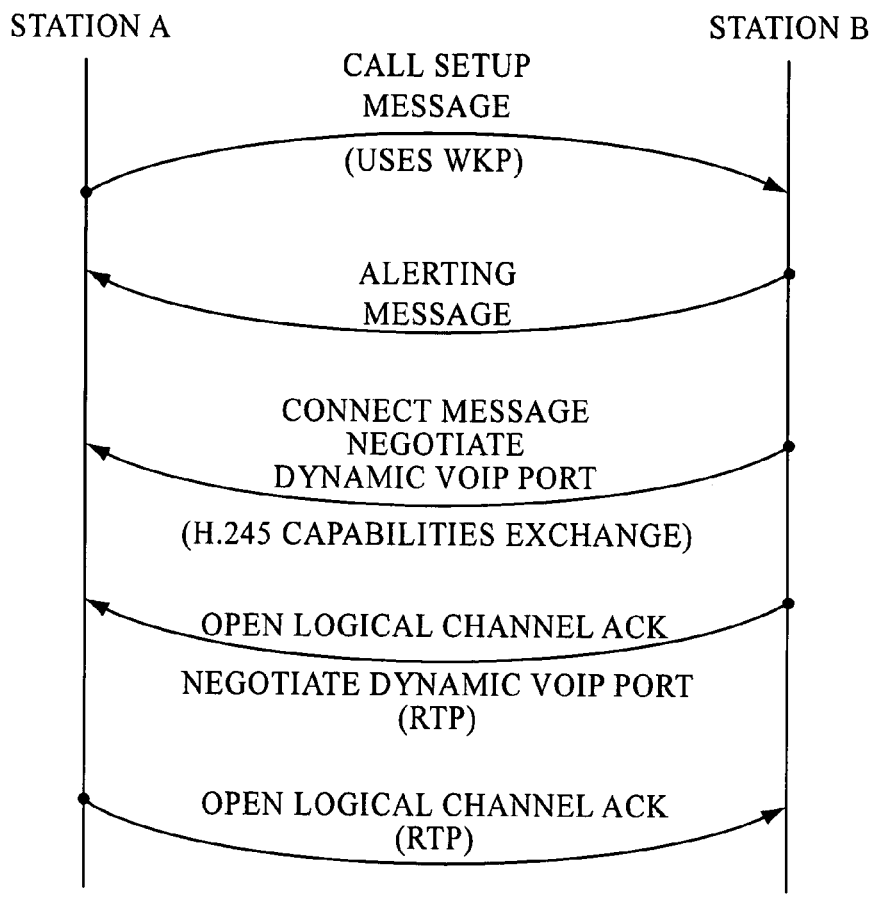
FIG. 25 illustrates a VOIP call setup process.

With regard to VOIP setup procedures, it must first be noted that various accepted protocols currently support VOIP data transmission. Although no particular protocol appears to be widely accepted, the following protocols are generally known in the industry: International Telecommunications Union (ITU) H.323, Packetcable™ Media Gateway Control Protocol (MGCP), and Internet Engineering Task Force (IETF) Session Initiation Protocol (SIP). Therefore, in the interest of simplicity, only ITU H.323 will be discussed in detail, despite the fact that the present invention is configured to operated with many other protocols. Since ITU H.323 was one of the first VOIP protocols on the public market, it is generally utilized more often than other accepted protocols. However, close examination of H.323 reveals that this protocol is actually a combination/collection of smaller protocols. In particular, H.323 generally includes three types of message protocols under the H.323 umbrella: first, an H.225 call signaling protocol; second, an H.245 capabilities exchange protocol; and third, a Real-Time Protocol (RTP) for real-time transporting of data. Therefore, an H.323 message session, which for exemplary purposes will be set up between Station A and Station B where Station A calls Station B, generally begins with an H.225 call setup message being sent from Station A to Station B, as shown in FIG. 25. All H.225 call setup messages utilize a Well-Known-Port (WKP), which is assigned by the H.323 host-call, to conduct the call setup message process. The WKP number is an assigned layer four port number used by the transmission control protocol (TCP) to identify the software processes in the machines sending and receiving the packets, as well as being used as the destination port number in the TCP packet header. Therefore, when a station receives an IP packet where the TCP destination is the H.323 WKP, the station knows that this packet belongs to an H.323 process. Further, in this particular packet, the source port in the TCP header can be any arbitrary port number the originating machine assigns. When the receiving machine replies to the originating machine, the source and destination ports are simply reversed. Therefore, it will use the H.323 WKP as the source port and the original source port as the destination port, which allows the H.225 call control between the two machines to simply use these two ports to communicate. Once the setup message is sent from Station A to Station B, an alerting message is replied from Station B to Station A. This first set of messages is generally utilized for call setup. If the setup process is successful, a new TCP connection is then established on a dynamically negotiated layer four port. This dynamically negotiated layer four port, which is used to transmit the H.245 messages, is then used to dynamically negotiate a second layer four port, which will be used to transmit the RTP messages. This dynamically negotiated port for RTP messages, which for purposes of this disclosure will be called the dynamically negotiated RTP port, is then used to transmit VOIP messages between the session participants for the entirety of the VOIP session. Therefore, once the respective end stations negotiate the RTP port, all subsequent media messages related to the call between Station A and Station B will utilize the negotiated RTP port. It should be noted, however, that the discussion of a dynamically negotiated port throughout the specification is intended to include the dynamic negotiation of one or more ports.

Returning to the discussion of the present invention, when Station A initiates the call setup message process with Station B, the network switch in the present exemplary embodiment is configured to trap or filter these messages and determine the WKP information and the dynamically negotiated layer four RTP port. This trapping process is simplified by the fact that the network switch of the present exemplary embodiment can be pre-configured to watch and/or filter for the layer four WKPs coming through the switch, as these ports are generally initialized upon startup by the software, and therefore, can be preset in the fast filtering processor of the network switch for filtering thereof. Thus, when a control message is trapped traveling through the network switch with a WKP contained therein, the network switch, and in particular FFP 141, knows that a call setup message is being sent. With a call setup message determined, the network switch then begins to snoop the H.245 protocol messages to determine the RTP port for the call being set up. At this point the CPU for the network switch can be used to assist the switch in determining the dynamically negotiated RTP port, or alternatively, the fast filtering processor and accompanying logic of the network switch may be configured to determine the negotiated port. Once the negotiated RTP port is determined by the switch, all subsequent VOIP media traffic for the particular session uses the negotiated RTP port, and can therefore be filtered and reclassified based upon the association with the RTP port in order to reduce latency as a result of data congestion in a network.

In an embodiment of the present invention, when the network switch is initialized, various permanent entries are entered into the fast filtering processor. These permanent entries or filters can correspond to VOIP applications, and will remain in the fast filtering processor for as long as the network switch is active, or until removed from the fast filtering processor by an administrator through the CPU. With regard to the present invention, specific entries entered may include entries corresponding to the WKPs of the various VOIP applications on the network. Thereafter, using these entries, when a call control packet, for example, from an H.323 type machine/process, is sent through the network switch, the switch traps the control packet with the fast filtering processor, as the WKP's for these control packets were preprogrammed into the fast filtering processor upon initialization. Once trapped, a control packet may be sent to the CPU for interpretation/decoding, which is generally accomplished by a decoder, and therefore, the CPU is able to obtain the negotiated media channels, which generally correspond to the layer four RTP port of the two H.323 clients. Thereafter, the CPU can dynamically implement appropriate filters and actions into the fast filtering processor, so that all subsequent packets for this H.323 session associated with the negotiated RTP port are given a predetermined priority, TOS, etc. by the filtering action of the fast filtering processor, which enables the VOIP packets to avoid network congestion and maintain acceptable latency characteristics for clear voice reception. When the VOIP session is terminated between the two users, the CPU again snoops and traps a termination control message sent between the stations, so that the dynamically negotiated ports, which are no longer being used by the two stations, can be removed from the filters and actions of the fast filtering processor. This removal of the dynamically negotiated ports allows for more efficient memory management within the network switch. Although the snooping and rule determination operations are discussed above with respect to CPU involvement, it is contemplated within the scope of the present invention to conduct the aforementioned CPU related operations wholly within the network switch, thus minimizing and/or possibly eliminating CPU involvement.

Network switches capable of operating in the above noted configuration often include multiple modules associated with 100Base-T and Gigabit ports, which should not be confused with the layer 4 ports indicated in the TCP header noted above. The layer 4 ports noted above simply correspond to an "identifier" in the packet header that operates to identify the type of information contained in the packet, and therefore, identify the software or hardware at the end destination that will receive and operate upon the packet. Further, with most network switches capable of operating in the above note configuration, each module or port interface controller (PIC) corresponds with a plurality of 100Base-T ports, and often at least one Gigabit port. A filter rule table and a mask table are generally associated with each PIC ingress to filter the packets coming into one of the physical ports of the PIC, as discussed above with respect to the FFP 141 and the accompanying rules table 22.

Figure 26:
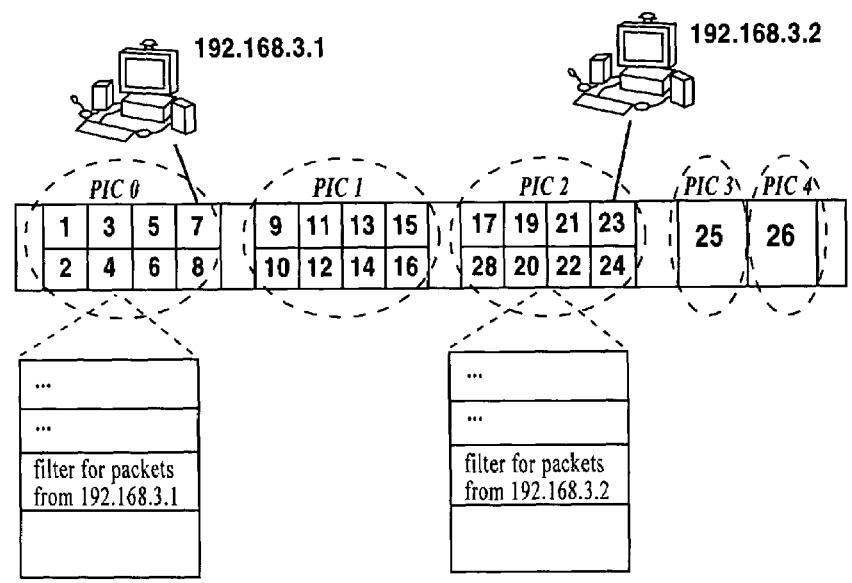
FIG. 26 illustrates an exemplary filtering scenario.

Although many filter rules and masks may be application specific, it is also contemplated within the scope of the present invention that various masks and/or filter rules may be shared by various VOIP applications, thus reducing the total number of required masks and/or filter rules. Therefore, packet filtering, which is done by the fast filtering processor, is accomplished when a packet enters the switch through a physical port. FIG. 26 illustrates an exemplary filtering scenario, wherein two PC's with station addresses 192.168.3.1 and 192.168.3.2 are engaged in a VOIP session. In this illustration physical ports 1–8 belong to PIC 0 on the network switch, while physical ports 17–24 belong to PIC 2 on on the network switch. Therefore, the pre-initialized filter rule table for PIC 0 contains an entry that filters out the packets coming from station 192.168.3.1, while the filter rule table of PIC 2 contains an entry that filters out packets coming from 192.168.3.2.

In order for the network switch to trap the initial call setup messages, which in the H.323 protocol are the H.225 messages, the fast filtering processor must have a permanent filter set up at initialization to capture any packet that has a destination port number that is equal to the WKP, for example. Therefore, the filter rule would be of the form: destination TCP port number=the well known port number. Using general packet header formats, wherein the layer two frame header is 18 bytes, followed by an IP header of 20 bytes, followed by a TCP header of 20 bytes, and followed by a TCP payload of 6 bytes, the desired destination TCP port number is generally the 3rd and 4th bytes of the TCP header. Therefore, if the WKP were 1720, and the filter rule of the form "destination TCP port number=1720" were implemented, then the rule would have the following value in hexadecimal:

| | | | | | | | |
|---|---|---|---|---|---|---|---|
| 0000 | 0000 | 0000 | 0000 | 0000 | 0000 | 0000 | 0000 |
| 0000 | 0000 | 0000 | 0000 | 0000 | 0000 | 0000 | 0000 |
| 0000 | 0000 | 0000 | 0000 | 06B8 | 0000 | 0000 | 0000 |
| 0000 | 0000 | 0000 | 0000 | 0000 | 0000 | 0000 | 0000. |

In the hexadecimal value, each two digits correspond to the value of one byte, and therefore, the value of 1720, or 06B8, resides in the 41st and 42nd bytes of the filter rule, which is illustrated as a 64 byte field. Therefore, for the fast filtering processor 141 to filter packets that match the above illustrated filter rule, a filter mask is required to filter out only the relevant fields in the packet before being matched with the filtering rules. As such, a filter mask for the rule noted above, which operates for the sole purpose of masking out the TCP destination port field, would have the following value:

| | | | | | | | |
|---|---|---|---|---|---|---|---|
| 0000 | 0000 | 0000 | 0000 | 0000 | 0000 | 0000 | 0000 |
| 0000 | 0000 | 0000 | 0000 | 0000 | 0000 | 0000 | 0000 |
| 0000 | 0000 | 0000 | FFFF | 0000 | 0000 | 0000 | 0000 |
| 0000 | 0000 | 0000 | 0000 | 0000 | 0000 | 0000 | 0000. |

This rule and mask would operate to trap a call setup message sent from a VOIP user attempting to set up a VOIP session with a second user, wherein the WKP of the call setup message is 1720. However, the reply message from the second VOIP user, the user contacted by the initial user, to the initial user traveling in the reverse direction would use the H.323 WKP as the source port, which correspond to the 1st and 2nd bytes of the TCP header. Therefore, another filter rule is needed in the filter rule table to trap the reverse/reply message. This particular filter rule would have the following value in hex:

| | | | | | | | |
|---|---|---|---|---|---|---|---|
| 0000 | 0000 | 0000 | 0000 | 0000 | 0000 | 0000 | 0000 |
| 0000 | 0000 | 0000 | 0000 | 0000 | 0000 | 0000 | 0000 |
| 0000 | 0000 | 0000 | 06B8 | 0000 | 0000 | 0000 | 0000 |
| 0000 | 0000 | 0000 | 0000 | 0000 | 0000 | 0000 | 0000. |

The mask corresponding to this filter would have the following form:

| | | | | | | | |
|---|---|---|---|---|---|---|---|
| 0000 | 0000 | 0000 | 0000 | 0000 | 0000 | 0000 | 0000 |
| 0000 | 0000 | 0000 | 0000 | 0000 | 0000 | 0000 | 0000 |
| 0000 | 0000 | 0000 | FFFF | 0000 | 0000 | 0000 | 0000 |
| 0000 | 0000 | 0000 | 0000 | 0000 | 0000 | 0000 | 0000. |

These two filters are all the fast filtering processor needs to trap the call setup messages between the two known VOIP stations. Since a VOIP session may come into the switch on any physical port, the filter rule table for each PIC must contain these two filter rules. Additionally, when the call setup messages are trapped by the fast filtering processor, a call reference number for the specific VOIP connection is recorded. This reference number may be recorded by the CPU, or alternatively, the reference number may be used to generate a filter rule to trap a terminate or disconnect message for the VOIP session. However, the main objective of the snooping and trapping the call setup messages is to extract the port negotiated for the H.245 protocol messages, which allows the switch to determine the subsequently negotiated RTP port that the two VOIP stations negotiate for transmitting the VOIP payload for the current VOIP session.

Once the RTP port numbers in particular are determined, one or more pair of filter, rules may be created in the fast filtering processor to trap all subsequent messages having the determined RTP port therein. These filter rules, following the above noted example, would have the following values:

| | | | | | | | |
|---|---|---|---|---|---|---|---|
| 0000 | 0000 | 0000 | 0000 | 0000 | 0000 | 0000 | 0000 |
| 0000 | 0000 | 0000 | 0000 | 0000 | 0000 | 0000 | 0000 |
| 0000 | YYYY | YYYY | 0000 | ZZZZ | 0000 | 0000 | 0000 |
| 0000 | 0000 | 0000 | 0000 | 0000 | 0000 | 0000 | 0000, | and

| | | | | | | | |
|---|---|---|---|---|---|---|---|
| 0000 | 0000 | 0000 | 0000 | 0000 | 0000 | 0000 | 0000 |
| 0000 | 0000 | 0000 | 0000 | 0000 | 0000 | 0000 | 0000 |
| 0000 | WWWW | WWWW | 0000 | XXXX | 0000 | 0000 | 0000 |
| 0000 | 0000 | 0000 | 0000 | 0000 | 0000 | 0000 | 0000, | wherein YYYYYYYY corresponds to the hexadecimal representation of the IP address of the station that specifies the RTP port number, and ZZZZ represents the negotiated RTP port number. The rules associated with trapping the RTP port messages traveling from the first station, Station A in the previous example, to the second station, Station B in the previous example, would be as follows:

Destination IP address=YYYYYYYY, and
Destination port=ZZZZ, while the rules for trapping the messages from Station B to Station A would be:

Destination IP address=WWWWWWWW, and
Destination port=XXXX.

The former rule resides in the filter rule table of PIC 0, while the latter rule resides in the filter rule table of PIC 2.

Once the RTP port is negotiated by the respective stations and trapped by the filtering processes of the network switch, the negotiated RTP port remains active for the duration of the VOIP session between the original callers. However, this negotiated port expires upon termination of the VOIP session between the users, and therefore, the associated rules and masks are removed from their respective tables. As an example of this process, when a release complete message is sent through the network switch, which indicates that the VOIP session is being terminated, the CPU will again trap this message as a result of the WKP therein, and subsequently remove the appropriate filters, masks, and/or rules.

During the general VOIP transmission stage, that is during the VOIP session outside of call setup and termination, the fast filtering processor 141 is configured to apply the mask determined above to each packet traveling through the switch. If the application of the mask determines that the packet is associated with a VOIP session, then the appropriate classification and/or prioritization action is taken upon the packet. These actions, which are defined by the action rules in the fast filtering processor 141, may include reclassification of the 802.1p priority, reclassification of the differentiated services priority, or reclassification of the TOS priority, among other actions. If the VOIP packet traveling through the network switch is already classified, then the network switch, and in particular the fast filtering processor, is configured to operate in a passive state. More particularly, if a VOIP frame is sent through the network switch, fast filtering processor 141 and the filters associated therewith are set up to recognize pre-classified packets and not take any classification action thereon. This feature renders the present invention compatible not only with nearly all VOIP systems/software packages that are not classification sensitive, but also with any systems that implement their own classification system. Furthermore, if desired, the fast filtering processor of the present invention could be programmed to in fact modify fields of pre-classified VOIP frames, if the user desired to override a preexisting prioritization scheme.

Figure 27:
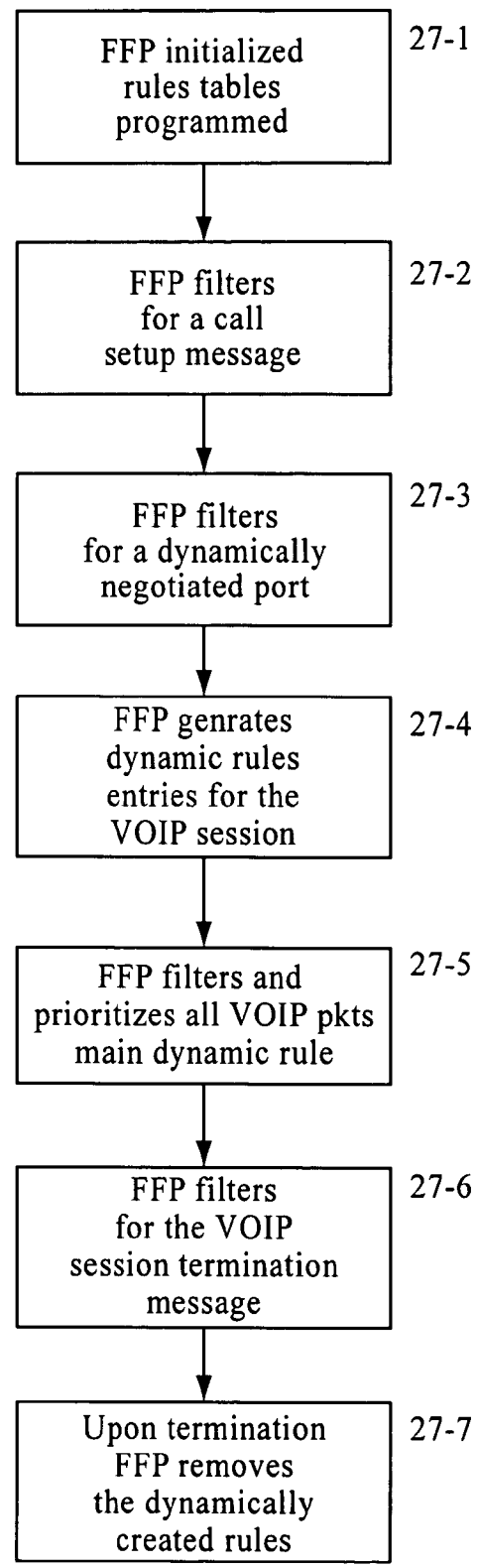
FIG. 27 illustrates an exemplary VOIP call setup process.

A summarization of the VOIP filtering process is shown in FIG. 27. The VOIP filtering process begins with step 27-1, where the tables of FFP 141 are initialized. At this step, for example, the VOIP software of the respective users would store entries in rules table 22, or other filtering related tables of FFP 141 corresponding to the WKPs for each respective users VOIP software/hardware. At step 27-2 FFP 141 filters all traffic traveling through network switch 125 in order to trap a VOIP call setup message. This process, for example, is conducted by using the preprogrammed WKP to identify a VOIP call setup message. Once a call setup message is identified by FFP 141, FFP 141 begins to filter for a dynamically negotiated port to be used for the particular VOIP session being set up between users in the call setup message at step 27-3. Upon determining the port negotiated by the VOIP users for all subsequent VOIP traffic, FFP 141, generally in conjunction with a CPU, dynamically generates appropriate filter masks and rules to trap all subsequent traffic for the particular VOIP session corresponding to the dynamically negotiated port at step 27-4. These dynamically negotiated filter rules are used to filter every VOIP media packet for the particular VOIP session at step 27-5. Additionally, the filtering process of step 27-5 generally includes changing a priority, or field similar thereto, of the VOIP packet in order to allow the packet to travel through the data network despite network congestion. At step 27-6 FFP 141 filters for a message in the VOIP session indicating that the VOIP session is being terminated. Upon identifying a session termination message, the CPU, or alternatively FFP 141, removes the VOIP session specific filters/rules from memory or tables within FFP 141 at step 27-7, such that the memory space occupied by these filters/rules is made available for use.

Therefore, through the use of the present invention, an apparatus and method for transmitting VOIP frames through a data network is provided, wherein the apparatus and method are each configured to receive VOIP input from various types of VOIP sources and efficiently transmit this input through a data network, even when the data network is operating in a congested state. The efficiency of transmission is a result of trapping/filtering VOIP call setup messages, determining the negotiated layer 4 port associated with the VOIP session, and filtering all subsequent VOIP data frames having the negotiated port associated therewith. The filtering actions generally include modifying the priority, classification, or other traffic control parameter of the data frame so that the data frame can be transmitted through the data network ahead of other non-latency sensitive data frames. Since the present apparatus and method are configured to simply receive VOIP data frames, the present invention is compatible with nearly all VOIP systems, regardless of manufacturer or configuration. Furthermore, although the present exemplary embodiment has been described using the H.323 protocol, the fast filtering processor, and in particular the filtering and action tables of the fast filtering processor, can be initialized with entries relevant to any VOIP system. Therefore, if another protocol does not use, for example, a WKP, the filtering tables of the fast filtering processor can be initialized by the CPU to snoop for another parameter associated with the VOIP frames of the particular protocol, which provides vast flexibility to the present invention.

Additionally, although the present invention has been described based upon the above noted embodiment, it would be apparent to those of skilled in the art that certain modifications, variations, and alternative constructions/configurations would be available, while remaining within the spirit and scope of the invention. For example, although specific VOIP configurations are discussed above, the present invention may be applied to various other VOIP configurations. Therefore, in order to determine the metes and bounds of the invention, reference should be made to the appended claims.

The invention claimed is:

1. A method for switching VOIP packets in a data network, said method comprising the steps of:
   receiving a first packet in a network switch;
   determining if the first packet is a VOIP packet;
   determining a dynamically negotiated VOIP port for a VOIP session from at least one of the first packet and a second packet received in the network switch, if the first packet is determined to be the VOIP packet; and
   classifying all subsequent VOIP packets corresponding to the dynamically negotiated VOIP port in accordance with predetermined parameters and associating a priority with the subsequent packets to avoid network congestion;
   wherein the step of classifying all subsequent VOIP packets further comprises,
   storing the dynamically negotiated VOIP port;
   filtering all packets coming through the network switch having the dynamically negotiated VOIP port associated therewith;
   classifying filtered packets in accordance with predefined filtering actions; and
   wherein the step of storing the dynamically negotiated VOIP port further comprises generating a filter corresponding to the dynamically negotiated VOIP port and storing the generated filter in a filter table associated with a fast filtering processor.

2. A method for switching VOIP packets in a data network as recited in claim 1, wherein the step of determining a dynamically negotiated VOIP port further comprises determining a layer four port negotiated by at least two VOIP users for exclusive use in transmitting VOIP frames for a particular VOIP session.

3. A method for switching VOIP packets in a data network as recited in claim 1, wherein the step of determining a dynamically negotiated VOIP port further comprises at least one of extracting the dynamically negotiated VOIP port from the first packet and sending the second packet to a CPU for decoding and extraction of the dynamically negotiated VOIP port.

4. A method for switching VOIP packets in a data network as recited in claim 1, wherein the step of determining a dynamically negotiated VOIP port further comprises determining an RTP protocol port.

5. A method for switching VOIP packets in a data network as recited in claim 1, wherein the filtering step further comprises the steps of:
   applying a filter mask to a packet header; and
   comparing unmasked header information to an entry in the filter table; and
   determining a match between the unmasked header information and the entry in the filter table.

6. A method for switching VOIP packets in a data network as recited in claim 1, wherein the step of classifying filtered packets further comprises taking a filtering action upon a filtered packet in accordance with predetermined actions stored in a filter action table.

7. A method for switching VOIP packets in a data network as recited in claim 6, wherein the filtering action comprises at least one of modifying a priority associated with the filtered packet, modifying a differentiated services parameter of the filtered packet, modifying a type of service parameter of the filtered packet, sending the filtered packet to a CPU, and dropping the filtered packet.

8. A method for switching VOIP packets, said method comprising the steps of:
   filtering packets received in a network switch to trap at least one VOIP call setup message;
   determining a dynamically negotiated VOIP port;
   filtering all subsequent packets associated with the dynamically negotiated VOIP port;
   classifying all subsequent packets corresponding to the dynamically negotiated VOIP port in accordance with predetermined parameters and associating a priority with the subsequent packets to avoid network congestion; and
   taking predefined filtering actions upon the subsequent packets;
   wherein the steps of filtering packets and determining the dynamically negotiated VOIP port further comprises generating a filter corresponding to the dynamically negotiated VOIP port and storing the generated filter in a filter table associated with a fast filtering processor.

9. A method for switching VOIP packets as recited in claim 8, wherein the step of filtering packets to trap at least one VOIP call setup message further comprises the step of filtering packets with a fast filtering processor to determine if a packet header contains a predefined well known port therein.

10. A method for switching VOIP packets as recited in claim 8, wherein the step of determining a dynamically negotiated VOIP port further comprises the steps of:
   transmitting packets from a capabilities exchange protocol message to a CPU;
   decoding the capabilities exchange protocol message to determine the dynamically negotiated VOIP port; and
   storing a filter corresponding to the dynamically negotiated VOIP port in a fast filtering processor.

11. A method for switching VOIP packets as recited in claim 8, wherein the step of filtering all subsequent packets associated with the dynamically negotiated VOIP port further comprises the steps of:
   applying a filter to all packets being switched through the network switch to determine which packets are associated with the dynamically negotiated VOIP port; and
   applying a filtering action to all packets determined to be associated with the dynamically negotiated VOIP port,
   wherein the filtering action includes modifying a priority of a packet in order to reduce network transmission delay for the packet.

12. A method for switching VOIP packets as recited in claim 11, wherein the step of modifying the priority includes at least one modifying a priority associated with the packet, modifying a differentiated services parameter of the packet, modifying a type of service parameter of the packet, sending the packet to a CPU, and dropping the packet.

13. A network switch for switching VOIP packets, said network switch comprising:
   at least one data port interface controller supporting a plurality of data ports for transmitting and receiving data;
   a fast filtering processor in communication with the at least one data port interface; and
   at least one filtering table in communication with the fast filtering processor,
   wherein the fast filtering processor is configured to snoop packets being transmitted through the network switch to trap a VOIP call setup message, and thereafter, determine a dynamically negotiated VOIP port so that all subsequent VOIP packets can be filtered and assigned an appropriate priority.

14. A network switch as recited in claim 13, wherein said fast filtering processor further comprises:
   a filter unit for constructing and applying a filter to selected fields of an incoming packet, said filter unit including filter logic for selecting desired fields of the incoming packet and copying selected field information therefrom, said filtering logic constructing a field value based upon the selected fields, wherein the filter logic applies a plurality stored field masks on the field value; and
   a rules table containing a plurality of rules entries,
   wherein the filter logic performs a lookup of the rules table in order to determine actions to be taken based upon the result of a comparison between the field value and the stored filter masks and the rules table lookup.

15. A network switch as recited in claim 14, wherein the filter logic is configured to perform a binary search of the rules table in order to determine a match.

16. A network switch as recited in claim 14, wherein said network switch includes a CPU interface, and wherein the rules table is programmable by a remote CPU through the CPU interface.

17. A network switch as recited in claim 16, wherein said fast filtering processor filters the packets independent of the CPU interface.

18. A network switch as recited in claim 14, wherein the filter unit can be configured to modify incoming packets to change a priority handling field therein.

19. A network switch as recited in claim 14, wherein the rules table, the filter unit, and the CPU interface are implemented on a single silicon substrate.

20. A network switch as recited in claim 14, wherein said filter logic copies the selected field information from a plurality of fields of an incoming packet, and constructs a field value of a predetermined size based upon the selected field information.

21. A network switch as recited in claim 13, said network switch further comprising:
   a memory management unit in communication with said at least one data port interface controller;
   a memory interface in communication with said at least one data port interface controller, wherein said memory interface is configured to communicate with a memory; and
   a communication channel, said communication channel for communicating data and messaging information between said at least one data port interface controller, said memory interface, and said memory management unit,
   wherein said memory management unit is configured to route data received from said at least one data port interface controller to said memory interface.

22. A network switch as recited in claim 21, wherein said memory interface further comprises:
   an internal memory; and
   an external memory interface for communicating with an external memory.

23. A network switch as recited in claim 13, wherein said fast filtering processor is programmable by inputs from a CPU through a CPU interface.

24. A method for switching VOIP packets in a data network, said method comprising the steps of:
receiving a first packet in a network switch;
determining if the first packet is a VOIP packet;
determining a dynamically negotiated VOIP port for a VOIP session from at least one of the first packet and a second packet received in the network switch, if the first packet is determined to be the VOIP packet; and
classifying all subsequent VOIP packets corresponding to the dynamically negotiated VOIP port in accordance with predetermined parameters and associating a priority with the subsequent packets to avoid network congestion;
wherein said steps of determining if the first packet is a VOIP packet, determining a dynamically negotiated VOIP port, and classifying subsequent VOIP packets are performed in a filtering step by a fast filtering processor; and
wherein said filtering step further comprises,
applying a filter mask to a header of a packet;
extracting unmasked information;
comparing the unmasked information to a filtering table; and
executing predetermined filtering actions based upon the comparison to the filtering table.

25. A method for switching VOIP packets in a data network, said method comprising the steps of:
receiving a first packet in a network switch;
determining if the first packet is a VOIP packet;
determining a dynamically negotiated VOIP port for a VOIP session from at least one of the first packet and a second packet received in the network switch, if the first packet is determined to be the VOIP packet; and
classifying all subsequent VOIP packets corresponding to the dynamically negotiated VOIP port in accordance with predetermined parameters and associating a priority with the subsequent packets to avoid network congestion;
wherein the step of determining if the first packet is a VOIP packet further comprises the steps of,
applying a filter mask to the packet header;
comparing unmasked information from the header to entries in a filter table to determine a match; and
determining if a VOIP well known port is contained in the packet header.

26. A method for switching VOIP packets in a data network as recited in claim 25, wherein said step of determining if a VOIP well known port is contained in the packet header further comprises storing the well known port in the filtering table upon initialization of the network switch.

* * * * *